United States Patent
Roddy et al.

(10) Patent No.: US 11,695,184 B2
(45) Date of Patent: *Jul. 4, 2023

(54) PORTABLE MODULAR ENERGY STORAGE

(71) Applicants: Daniel Francis Roddy, Cabin John, MD (US); Andrew Scogna, Tampa, FL (US)

(72) Inventors: Daniel Francis Roddy, Cabin John, MD (US); Andrew Scogna, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,868

(22) Filed: Jul. 9, 2021

(65) Prior Publication Data
US 2022/0069406 A1 Mar. 3, 2022

Related U.S. Application Data

(63) Continuation of application No. 16/719,463, filed on Dec. 18, 2019, now Pat. No. 11,069,938, which is a
(Continued)

(51) Int. Cl.
*H01M 50/256* (2021.01)
*B60L 53/80* (2019.01)
(Continued)

(52) U.S. Cl.
CPC .......... *H01M 50/256* (2021.01); *B60L 50/64* (2019.02); *B60L 53/80* (2019.02); *H01M 50/213* (2021.01);
(Continued)

(58) Field of Classification Search
CPC ... H01M 2/1005; H01M 2/1077; B60L 11/00; B60L 15/00; B60L 53/00; B60L 3/00;
(Continued)

(56) References Cited

U.S. PATENT DOCUMENTS

| | | | |
|---|---|---|---|
| 4,334,819 A | 6/1982 | Hammerslag | |
| 4,450,400 A | 5/1984 | Gwyn | |

(Continued)

FOREIGN PATENT DOCUMENTS

| | | |
|---|---|---|
| CN | 102529742 A | 7/2012 |
| TW | 202015278 A | 4/2020 |
| WO | 2020009817 A1 | 1/2020 |

OTHER PUBLICATIONS

Corrected Notice of Allowance entered in U.S. Appl. No. 16/193,180, dated Jun. 7, 2019, 2 pages.
(Continued)

*Primary Examiner* — Kaitlin S Joerger
(74) *Attorney, Agent, or Firm* — Vorys, Sater, Seymour and Pease LLP; Khaled Shami

(57) ABSTRACT

In certain embodiments, a system includes a belt for mechanically linking multiple energy storage cells together, wherein the multiple energy storage cells are grouped into at least first and second energy storage packs, each energy storage pack including at least one energy storage cell, the at least one energy storage cell of the first energy storage pack having a different energy storage characteristic from the at least one energy storage cell of the second energy storage pack. The system further includes an operational zone for receiving an energy storage pack and establishing an electrical connection between the received energy storage pack and an electrical device, and an actuator operable to move the multiple energy storage cells together to thereby dispose the first energy storage pack in the operational zone to establish the electrical connection with the electrical device.

29 Claims, 28 Drawing Sheets

Related U.S. Application Data continuation of application No. 16/419,634, filed on May 22, 2019, now Pat. No. 10,573,859, which is a continuation-in-part of application No. 16/371,275, filed on Apr. 1, 2019, now Pat. No. 10,446,809, which is a continuation of application No. 16/193,180, filed on Nov. 16, 2018, now Pat. No. 10,355,254, which is a continuation-in-part of application No. 16/146,777, filed on Sep. 28, 2018, now Pat. No. 10,720,614.

(60) Provisional application No. 62/693,721, filed on Jul. 3, 2018.

(51) Int. Cl.
    *H01M 50/251* (2021.01)
    *B60L 50/64* (2019.01)
    *H01M 50/249* (2021.01)
    *H01M 50/213* (2021.01)

(52) U.S. Cl.
    CPC ....... *H01M 50/249* (2021.01); *H01M 50/251* (2021.01); *H01M 2220/20* (2013.01)

(58) Field of Classification Search
    CPC .......... B60L 3/004; B60L 58/10; B60L 58/14; B60L 58/16; B60L 58/18; B60K 1/04; B60S 5/06
    See application file for complete search history.

(56) References Cited

U.S. PATENT DOCUMENTS

| | | | |
|---|---|---|---|
| 5,427,194 A | 6/1995 | Miller | |
| 5,549,443 A | 8/1996 | Hammerslag | |
| 5,668,460 A | 9/1997 | Lashlee et al. | |
| 5,668,490 A | 9/1997 | Mitra et al. | |
| 5,711,648 A | 1/1998 | Hammerslag | |
| 5,821,733 A | 10/1998 | Turnbull | |
| 5,927,938 A | 7/1999 | Hammerslag | |
| 5,951,229 A | 9/1999 | Hammerslag | |
| 7,074,518 B2 | 7/2006 | Vigier et al. | |
| 7,074,528 B2 | 7/2006 | Schacht et al. | |
| 7,602,143 B2 | 10/2009 | Capizzo | |
| 8,138,720 B2 | 3/2012 | Snyder et al. | |
| 8,461,804 B1 | 6/2013 | Capizzo | |
| 9,187,004 B1 | 11/2015 | Davis | |
| 9,815,470 B2 | 11/2017 | Luther et al. | |
| 10,355,254 B1 * | 7/2019 | Roddy | B60L 50/64 |
| 10,446,809 B1 * | 10/2019 | Roddy | H01M 10/48 |
| 10,573,859 B2 * | 2/2020 | Roddy | B60L 50/64 |
| 10,720,614 B2 * | 7/2020 | Roddy | B60L 53/80 |
| 11,069,938 B2 * | 7/2021 | Roddy | B60L 58/21 |
| 2006/0208698 A1 | 9/2006 | Maguire et al. | |
| 2009/0058355 A1 | 3/2009 | Meyer | |
| 2009/0096418 A1 | 4/2009 | Abadia et al. | |
| 2010/0101879 A1 | 4/2010 | McVickers | |
| 2010/0143771 A1 | 6/2010 | Jeong et al. | |
| 2012/0013340 A1 | 1/2012 | Yuasa et al. | |
| 2012/0015223 A1 | 1/2012 | Bhardwaj et al. | |
| 2012/0056585 A1 | 3/2012 | Mariels | |
| 2012/0083948 A1 | 4/2012 | Tate, Jr. et al. | |
| 2012/0187898 A1 | 7/2012 | Nysen | |
| 2012/0187909 A1 | 7/2012 | Nysen | |
| 2014/0127552 A1 | 5/2014 | Lu et al. | |
| 2018/0041053 A1 | 2/2018 | Capizzo | |

OTHER PUBLICATIONS

Massive Dynamic Battery Systems, "Massive Dynamic Battery Systems—Our Vision Of Moving The Future", uploaded Jul. 26, 2018, https://www.youtube.com/watch?v=qHgpr-Y45P4, accessed Dec. 26, 2019, 22 Pages.

Massive Dynamic Battery Systems, "Rapid Battery Exchange System Demonstration", uploaded Jul. 26, 2018, https://www.youtube.com/watch?v=ggegRK78Ylc&feature=youtu.be, accessed Dec. 26, 2019, 7 Pages.

Massive Dynamic Battery Systems, "Scout Mkl Racer—Showcasing The Rapid Battery Exchange System", uploaded Jul. 26, 2018, https://www.youtube.com/watch?v=Ua6-73Hi1Yk&feature=youtu.be, accessed Dec. 26, 2019, 9 Pages.

Non-Final Rejection entered in U.S. Appl. No. 16/146,777, dated Oct. 29, 2019, 6 pages.

Non-Final Rejection entered in U.S. Appl. No. 16/193,180, 6 pages.

Non-Final Rejection entered in U.S. Appl. No. 16/371,275, 6 pages.

Non-Final Rejection entered in U.S. Appl. No. 16/419,634, dated Sep. 2019, 5 pages.

Non-Final Rejection entered in U.S. Appl. No. 16/719,463, dated Nov. 3, 2020, 7 pages.

Notice of Allowance entered in U.S. Appl. No. 16/146,777, dated Mar. 11, 2020, 7 pages.

Notice of Allowance entered in U.S. Appl. No. 16/193,180, dated Apr. 29, 2019, 5 pages.

Notice of Allowance entered in U.S. Appl. No. 16/371,275, dated Sep. 3, 2019, 5 pages.

Notice of Allowance entered in U.S. Appl. No. 16/419,634, dated Jan. 8, 2020, 4 pages.

Notice of Allowance entered in U.S. Appl. No. 16/719,463, dated Mar. 17, 2021, 5 pages.

Notice of IPRP and International Preliminary Report on Patentability dated Jan. 14, 2020, 15 Pages.

Roddy, D., International Search Report and Written Opinion of ISA, PCT App. No. PCT/US2019/038538, dated Oct. 24, 2019, 49 pages.

U.S. Appl. No. 662/693,721, D. Roddy, filed Jul. 7, 2018, 11 pages.

\* cited by examiner

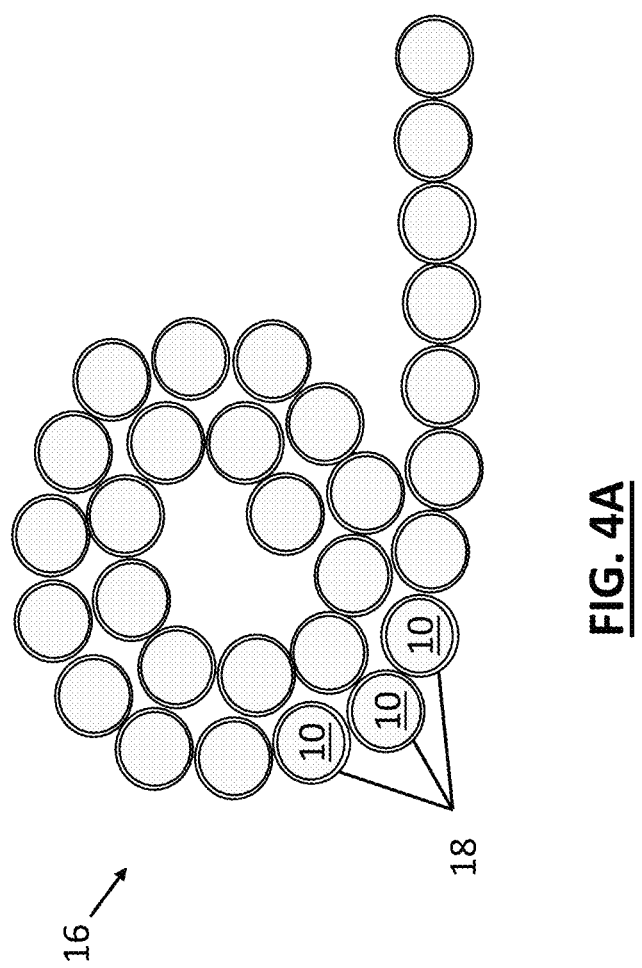

PORTABLE MODULAR ENERGY STORAGE

SUMMARY OF RELATED APPLICATIONS

This application is a continuation of U.S. patent application Ser. No. 16/719,463, filed Dec. 18, 2019, which is a continuation of U.S. patent application Ser. No. 16/419,634, filed on May 22, 2019, now U.S. Pat. No. 10,573,859, which claims priority from U.S. Provisional App. No. 62/693,721, filed Jul. 3, 2018 and which is a continuation-in-part of U.S. patent application Ser. No. 16/371,275, filed on Apr. 1, 2019, now U.S. Pat. No. 10,446,809, which is a continuation of U.S. patent application Ser. No. 16/193,180, filed on Nov. 16, 2018, now U.S. Pat. No. 10,355,254, which is a continuation-in-part of U.S. patent application Ser. No. 16/146,777, filed on Sep. 28, 2018, now U.S. Pat. No. 10,720,614, the contents of all of which are incorporated herein by reference in their entirety.

TECHNICAL FIELD

The present disclosure relates generally to energy storage, for example in the form of a portable battery pack usable for powering electrical devices such as vehicles.

BACKGROUND

Current rechargeable battery systems involve a charge cycle and discharge cycle. There is a need for thermal regulation or other current flow control measures that prevent too much current from being drawn from the unit energy cells, causing overheating of the energy interface and the individual cells. In addition, with reference to FIG. 1, there is a need for a cool-down period between charging the battery and its use (discharging the battery), as well as between use and when the battery can be charged again. Fast charging or discharging in particular can be especially prone to overheating the battery. Failure to accommodate the cool-down period can result in permanent damage to the battery cells or possible fire or explosion. The difficulty with this cycle is that it may be interrupted by user demand, requiring use of the battery when it is in the middle of charging, or when immediate charging for immediate use are desired. Any additional thermal discharge (heating) results in loss of energy and waste heat as opposed to charge. An illustrative case is electric vehicles, wherein a discharging period, as the foot pedal is pressed to apply power to the motor, is abruptly interrupted by a charging period when the driver releases the foot pedal and applies the brakes to initiate regenerative braking; only to then release the brake and press the pedal again to apply power to the motor and initiate discharging again, and so on.

In addition, current battery systems suffer from a difference in the charge levels of individual cells, or from any defect or problem with a single cell. The defect can be from localized chemical or mechanical failure or overheating, charge level difference, or a manufacturing defect. For example, when the charge of a single cell in an array of cells is lower than the rest of the cells in the array, the array can only charge to the level of the lowest cell in the array, in effect limiting the useful potential of the entire array to that of a single cell. FIG. 2 shows how the array or bank of batteries, three in this case, on discharge can only discharge the amount of charge in the lowest level cell in the array (cell 1). Cells 2 and 3, on discharge (right side of drawing figure) have unusable charge remaining because they are unable to continue to discharge once cell 1 has been depleted.

There are methods for conditioning the whole array, but these methods add discharge and charge cycles that involve complete discharge of the cells, which over time puts wear on the entire array, shortening its useful life. For these reasons there is a need for selective removal or replacement of a single cell or multiple cells.

There is also a problem with the versatility of existing battery systems. The battery packs come in different shapes and sizes and have different voltages, built to individual specifications that are not compatible with each other, even though internally many are based on the same unit cell battery. When these battery packs no longer hold useful charge, essentially reaching the end of their effective lives, they are discarded. The packs containing these batteries are frequently only suffering from the condition of one or two cells which if replaced would return the pack to serviceability. Replacing the defective cells could return the pack to useful service, in this way extending the useful life significantly. In addition, the less effective cells of these packs can be used in less demanding applications that do not require their full capacity. Both of these solutions would extend the life of the battery systems and reduce the amount of waste significantly.

Current vehicle battery systems do not allow for the rapid change of the battery packs. This requires vehicles to utilize plug-in chargers. Charge for these systems takes several hours for the cool, charge, cool and discharge cycle. Users driving on longer trips than the effective range of the vehicle's battery pack, or that require immediate use in the middle of the charging cycle, place undue demand on the battery packs. This can lead to damage to the battery packs from overheating and potentially leading to fires.

OVERVIEW

As described herein, an array of batteries are linked together mechanically in a flexible, serpentine belt arrangement that permits easy handling and manipulation of the array, and selective change-out and replacement of individual cells. The entirety of these linked batteries, or subsets thereof, can be electrically connected together as banks to provide selectable denominations of power.

Some advantages of the arrangements described herein include extending range of existing electric vehicles, such as trucks, forklifts, aircraft, water craft (including submarines), trains, hover crafts, motorbikes, and so on; providing retrofit to used vehicles providing rapid change of energy packs becomes an option, akin to pumping gas at a gas station; the ability to selectively change out individual cells in a pack for conditioning and fire safety; and providing rapid jettison of the energy units (cells) to prevent vehicle fire. Other advantages include flexible applications: home reserve power (that fits in the walls of a house for instance) and portable power units. Anywhere that a hose or conduit can be run can be adapted to similarly house a battery pack that is rapidly replaceable and serviceable down to the unit cell. Trucks, scooters, motorcycles, golf carts, all terrain and tactical vehicles, bikes, hover boards, undersea systems, drones, underwater personal propulsion systems, boats, data centers, government installations, uninterruptible power supplies, and military systems are examples of potential beneficiaries of this solution.

The arrangements as described herein open up many other markets and options, because the battery packs are easy to handle. Batteries can be charged from solar power or other power source, or charged at night at discounted rates from the utility grid for use during the day. The batteries can be grouped in subsets for charging, in cases where charging capacity is limited to a certain number of batteries, with one subset being charged at a time until all the batteries are charged. One application is to transport the battery pack to a first installation, such as the site of windmill or wind farm or other source of power, charge the battery pack there, in its entirety at once, or in subsets as mentioned above, then deliver it to a second installation, such as an individual vehicle or to station for customer pickup or use. Individuals can charge the battery packs at their house and sell/swap the packs with others. A whole industry of individual chargers in homes can eliminate the need and cost for a distribution system. This could provide a distributed energy solution for rural areas or developing countries and for use by the military and for disaster relief. It provides a renewable energy distribution solution without the wired distribution system requirements. Local communities can harness sun, water, wind, and other energy sources to charge energy units and distribute them for use to individuals and families to run home electrical systems, refrigeration, electrical vehicles, or medical equipment.

In certain embodiments, an additional cell or set of cells are added to a battery pack. The additional cell(s) can be charged, cooled, and discharged on a different cycle than the main set of cells in the existing battery. The principle is to use different charging cycles for some cells of the battery so that all cells will not be charging and discharging at the same time, thus reducing the thermal cycle in the battery. Each embodiment can be expanded to a large number of cells that charge/cool/discharge on different cycles to allow for more efficient use and to prevent thermal loss and damage.

In certain embodiments, a system includes a belt for mechanically linking multiple energy storage cells together, wherein the multiple energy storage cells are grouped into at least first and second energy storage packs, each energy storage pack including at least one energy storage cell, then at least one energy storage cell of the first energy storage pack having a different energy storage characteristic from the at least one energy storage cell of the second energy storage pack. The system further includes an operational zone for receiving an energy storage pack and establishing an electrical connection between the received energy storage pack and an electrical device, and an actuator operable to move the multiple energy storage cells together to thereby dispose the first energy storage pack in the operational zone to establish the electrical connection with the electrical device.

In certain embodiments, a method includes mechanically linking multiple energy storage cells together, wherein the multiple energy storage cells are grouped into at least first and second energy storage packs, each energy storage pack including at least one energy storage cell, the at least one energy storage cell of the first energy storage pack having a different energy storage characteristic from the at least one energy storage cell of the second energy storage pack. The method further includes providing an operational zone for receiving an energy storage pack and establishing an electrical connection between the received energy storage pack and an electrical device, and using an actuator to move the mechanically-linked multiple energy storage cells together to thereby dispose the first energy storage pack in the operational zone to establish the electrical connection with the electrical device.

In certain embodiments, a battery system includes a battery having first and second cells, and a controller for selecting, for each charge or discharge cycle of the battery, only one of the first or second cells for charge or discharge at a time.

In certain embodiments, a method for operating a battery having first and second cells includes operating the first and second cells on different charge/discharge cycles that are staggered in time, each cycle including a cooling period following each charge phase and a cooling period following each discharge phase.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 4A is a top plan view of coiled battery belt in accordance with certain embodiments;

FIG. 11A is a top view of a "zipper" configuration of a conduit in accordance with certain embodiments;

DESCRIPTION OF EXAMPLE EMBODIMENTS

The following description is illustrative only and is not intended to be in any way limiting. Other embodiments will readily suggest themselves to those of ordinary skill in the art having the benefit of this disclosure. Reference will be made in detail to implementations of the example embodiments as illustrated in the accompanying drawings. The same reference indicators will be used to the extent possible throughout the drawings and the following description to refer to the same or like items.

In the description of example embodiments that follows, references to "one embodiment", "an embodiment", "an example embodiment", "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. The term "exemplary" when used herein means "serving as an example, instance or illustration." Any embodiment described herein as "exemplary" is not necessarily to be construed as preferred or advantageous over other embodiments.

In the interest of clarity, not all of the routine features of the implementations described herein are shown and described. It will be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 3:
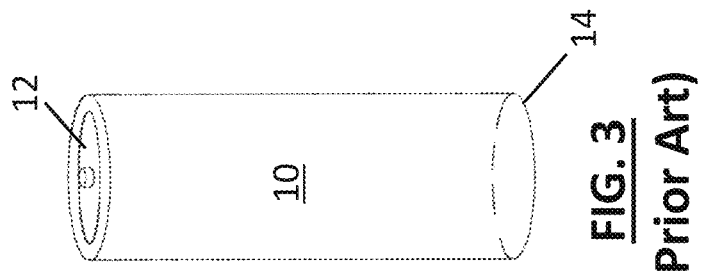
FIG. 3 is a diagram of a standard conventional battery.
Figure 2:
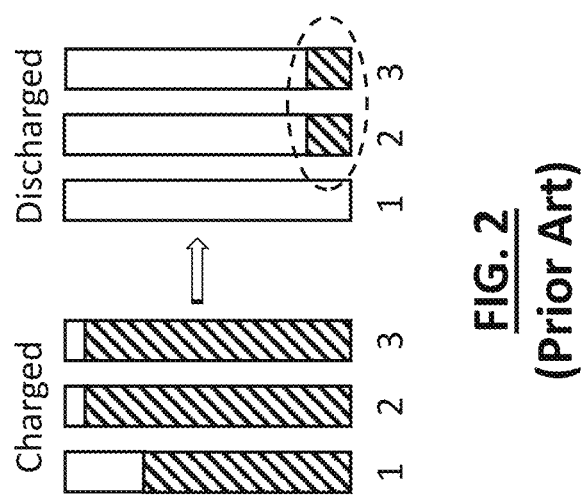
FIG. 2 is a diagram showing the limitations on charge and discharge of a conventional array of batteries.
Figure 1:
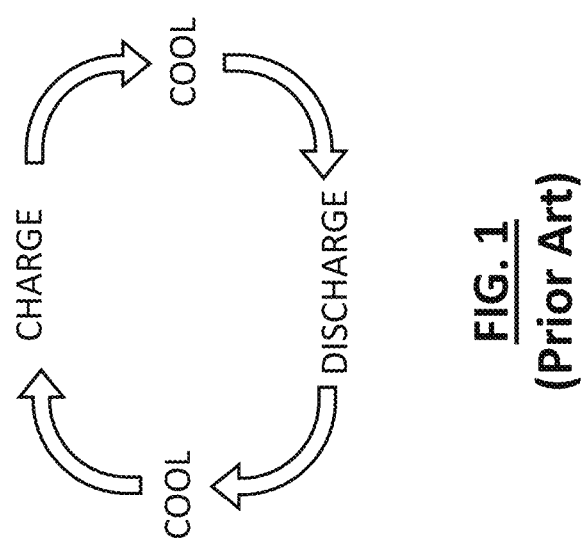
FIG. 1 is a battery charge/cool/discharge/cool cycle diagram.

For purposes of this description, the terms battery "pack," "array," or "bank" will refer to a set of one or more individual batteries or capacitors, or, more generally, energy storage cells or units, that may be connected together for charging, discharging or both. Each individual battery may also be referred to as a "cell." Moreover, each battery or cell will be understood to describe a rechargeable or single-use chemical battery or other energy storage device. Examples of rechargeable or single-use chemical batteries include, but are not limited to, lithium-ion and nickel cadmium batteries of various sizes and form factors, and of various power capacities and ratings as defined in terms power, voltage and current. One example form factor is shown in FIG. 3, in which a substantially cylindrical conventional battery 10 has a positive terminal 12 and a negative terminal 14. Specific examples of batteries include 18650 Panasonic batteries and the like, A-size, AA-size, AAA-size, C-size, D-size, batteries, and so on. More generally, however, the term battery or cell will be understood to refer to any energy or charge storage device and includes, inter alfa, capacitors and supercapacitors.

Figure 4:
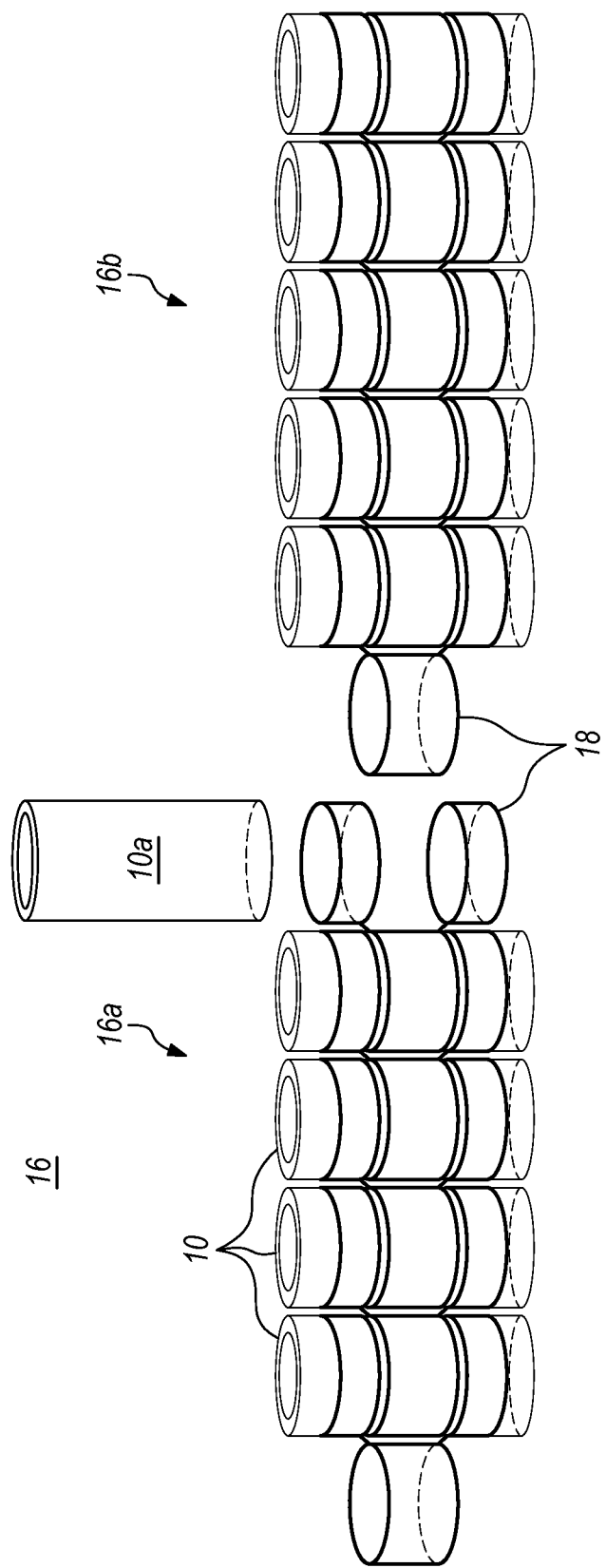
FIG. 4 is a side perspective view of a flexible severable battery belt 16 for mechanically linking together one or more batteries 10 in a linear fashion in accordance with some embodiments.

FIG. 4 is a side view of a flexible severable battery belt 16 for mechanically linking together one or more batteries 10 in a linear fashion in accordance with some embodiments. The belt 16 comprises a plurality of belt links 18 that are coupled to one another by the batteries 10 retained in them. Removal of a battery that is between two links, such as battery 10a in the drawing, results in severing of the belt 16 at that juncture into two detached battery belt segments, 16a and 16b. When in place, each battery 10 forms a mechanical connection between two consecutive belt links 18. The connection thus formed is flexible, with the two consecutive belt links 18 being pivotable, to a limited extent, around the linking battery, resulting in an overall flexible, serpentine battery belt arrangement. Such flexibility permits coiling the battery belt, as seen for example in FIG. 4A, or configuring it in an S-shape or any other shape that achieves compactness, ease of handling or packing, and conformance with different-shaped containers and conduits, improved heat exchange (for cooling), or myriad other advantages.

Figure 5:
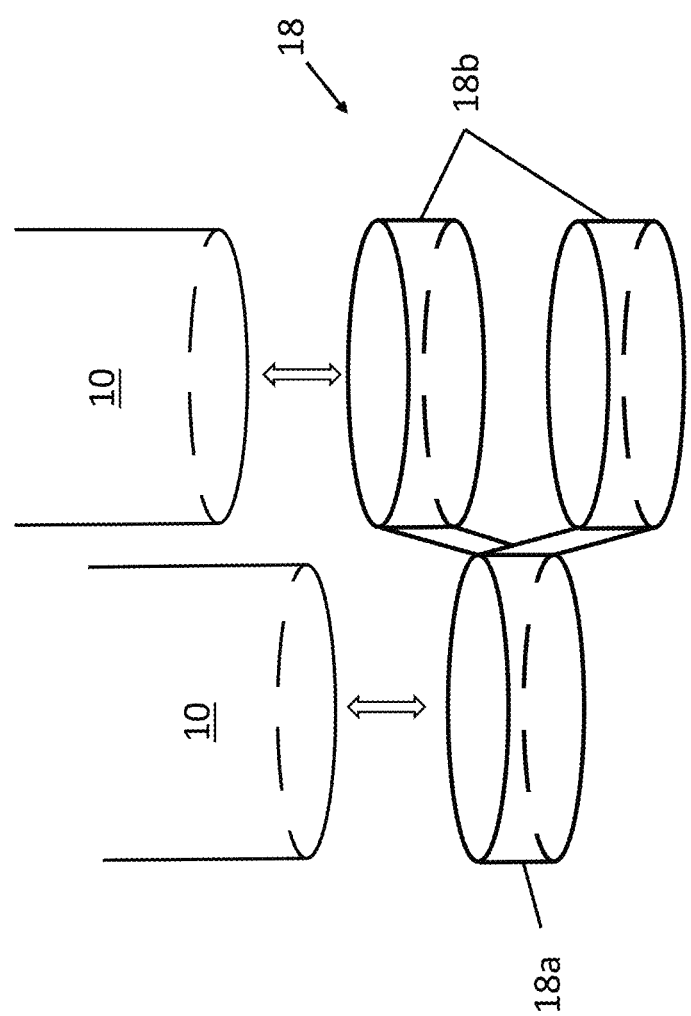
FIGS. 5 and 6 show different embodiments of links of a battery belt in accordance with certain embodiments.
Figure 6:
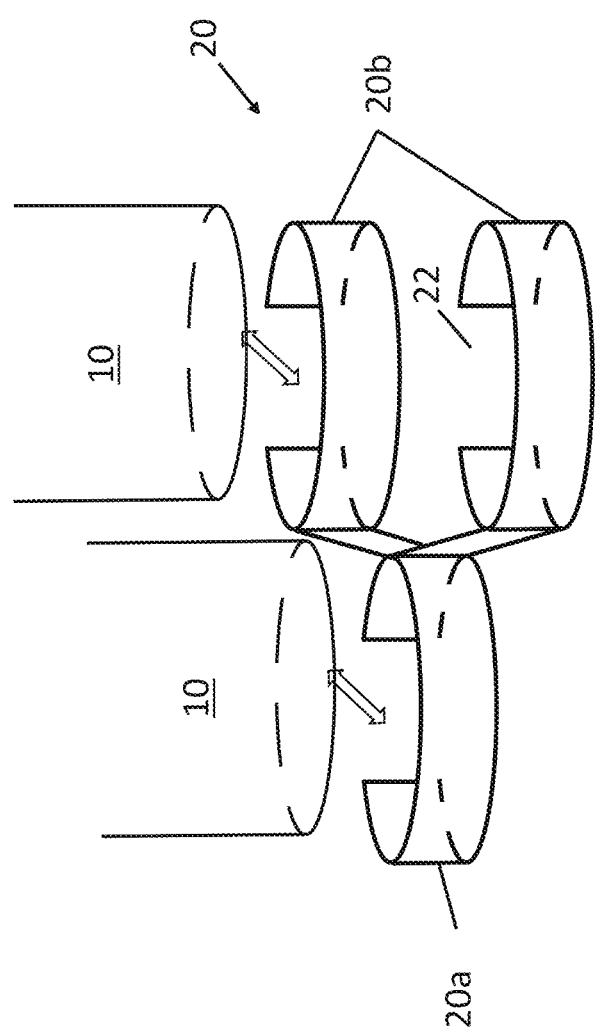

FIGS. 5 and 6 show different embodiments of the links of a belt such as battery belt 16. In FIG. 5, link 18 is a ring type link, in which one side comprises a single ring 18a, and the other side comprises dual, axially aligned rings 18b. The rings are sized to accommodate a battery 10 that is removably slidable into place in the rings as shown by the double-headed arrows. A limited interference fit may be employed in some embodiments to ensure the batteries are maintained in place in the ring. A ring 18a of one belt link fits, in axial alignment, between two rings 18b of a next consecutive belt link, to form a sequence of links that are coupled together by batteries interposed between them. In FIG. 6, link 20 is a C-clamp type link, in which one side comprises a single C-clamp 20a, and the other side comprises dual, axially aligned C-clamps 20b. The opening 22 of each C-clamp is smaller than the diameter of the batteries 20, and the C-clamps 20a and 20b are made of a material that is flexible enough to permit removability of the batteries 10 laterally, as shown by the double-headed arrows in FIG. 6, in addition to axially in the manner of the double-headed arrows of FIG. 5. Again, a ring 20a of one belt link fits, in axial alignment, between two rings 20b of a next consecutive belt link, to form a sequence of links that are coupled together by batteries interposed between them. Of course, it is also contemplated to provide a battery belt with links that are linked together regardless of the presence of the batteries therein, in which case even when a battery is removed, the battery belt would not be severed.

Figure 7:
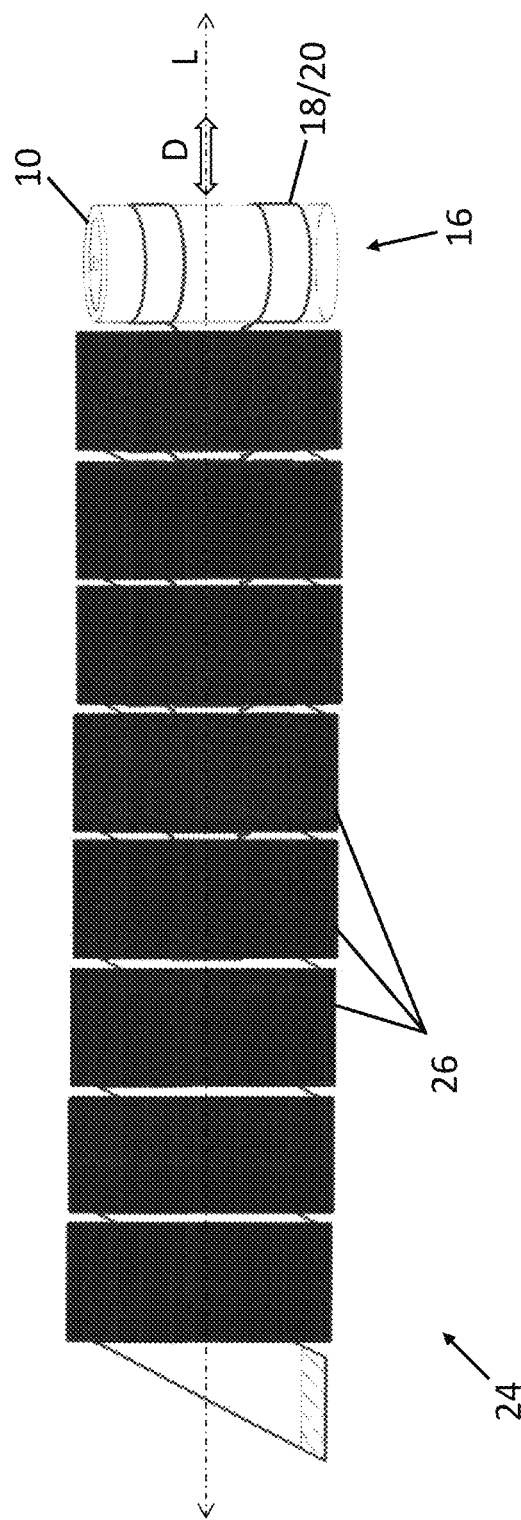
FIG. 7 is a side view of a battery conduit in accordance with some embodiments.

FIG. 7 is a side view of a battery conduit 24 in accordance with some embodiments. Battery conduit 24 extends linearly in the direction L, and accommodates therein battery belt 16, constraining the motion of the battery belt also to the linear direction, as shown by the double-headed arrow D. In this manner, battery belt 16 can be inserted and removed from the battery conduit 24 to any extent desired, and the batteries therein shifted or stepped sequentially in either direction as detailed below.

Figure 7C:
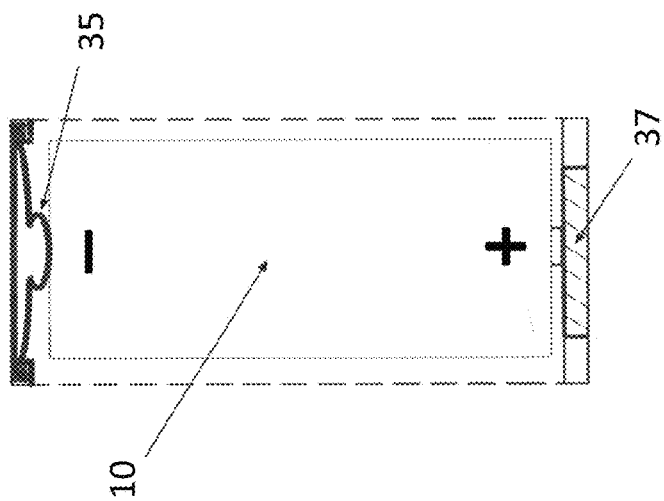
FIG. 7C is a schematic drawing showing a provision to maintain good electrical contact with a battery in accordance with certain embodiments.

Battery conduit 24 comprises individual battery conduit links 26, with each conduit link dimensioned to substantially correspond to one battery 10 on a 1 to 1 ratio basis for support of the battery therein. Other ratios are also contemplated—for example two or more batteries per link. Two conduit links 26, one of which contains a battery 10, are shown in more detail in FIG. 7A. Generally, each conduit link 26 includes opposing first and second major sides 28 and 30, and opposing first and second minor sides 32 and 34 that are generally all arranged to define a battery-conduit chamber therein. Considering the axial direction A-A of the battery, the first and second major sides 28 and 30 are generally in a parallel plane to the axial direction A-A, and the first and second minor sides 32 and 34 are generally in a transverse plane to the axial direction A-A. While the battery-conduit chamber is shown to be cuboid in shape, other shapes, such as cylinders, prisms, etc. are also contemplated, and the sides defining such a chamber would accordingly be configured differently from that described herein. Components (not shown) such as friction sliders, for example rails, to reduce friction and facilitate movement of batteries through the chambers; or for retaining batteries in place in the chambers, such as detents, springs, clamps, etc., can also be provided. In addition, expedients for cooling batteries in the conduit 24 can be provided, for example a cooling fluid circuit, cooling fins and heat sinks, and so on. In addition, a temperature management system including conduit-embedded sensors can be provided.

The sequence of conduit links 26 are constituted so as to establish an electrical connection among a select group or groups of the batteries 10, which may be referred to herein as the operational group, when the battery belt 16 is inserted into the battery conduit 24. The connection provides a collective "output" through which the batteries of the operational group can be electrically accessed for charging or discharging, or for testing. The connection may be series or parallel, although for brevity and clarity the focus of the description will be primarily the series connection. The term "discharge" is used to indicate use of the battery to provide power, for example to a motor of an electric vehicle, or to any device or component that requires electric power for operation.

Figure 7B:
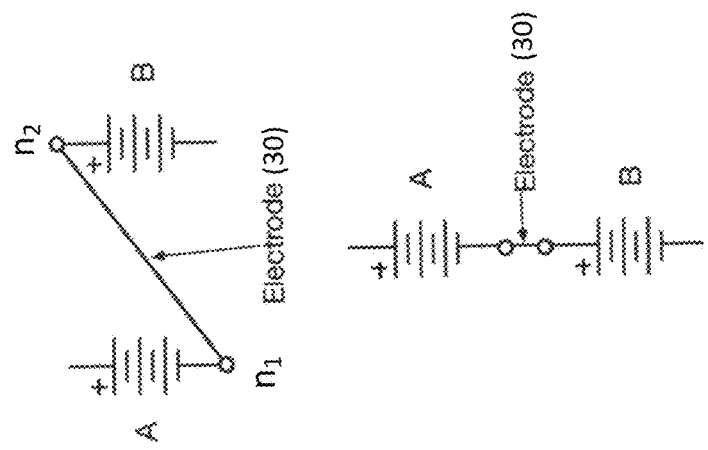
FIG. 7B is an electrical representation of the operation of links of a conduit in accordance with certain embodiments.
Figure 7A:
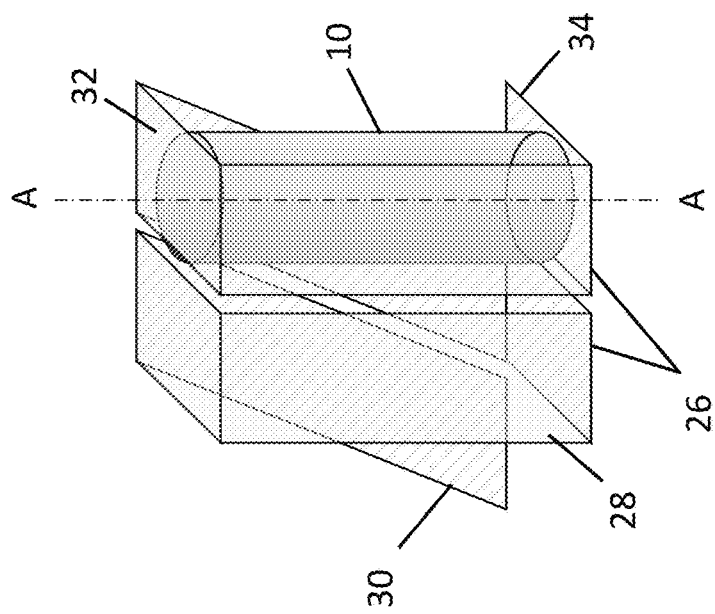
FIG. 7A is a view of details of two conduit links in accordance with certain embodiments.

To establish a serial connection of an operational group, minor sides 32 and 34 of each conduit link 26, or interior portions of the minor sides, are designed to electrically contact the positive and negative terminals of the battery in the conduit link. The minor sides 32 and 34, or the relevant portions thereof, are thus made of an electrically conducting material operable to contact the battery terminals. Major side 30, or a portion thereof, is also made of an electrically conducting material, and serves to provide an electrical connection between a conducting portion of a minor side 32 of one conduit link 26, and a conducting portion of a minor side 34 of a next conduit link in a sequence. For this reason, major side 30 may be referred to herein as the electrode, to be distinguished from the non-conducting major side 28, which mainly provides mechanical support. An electrical representation of this configuration, in which an electrically conducting path is established between a sequence of batteries by the conduit links is shown in FIG. 7B. Two consecutive batteries A and B are represented, connected in series by an electrode corresponding to a major side 30. The nodes $n_1$ and $n_2$ correspond to the minor sides 32 and 34, respectively.

Figure 7D:
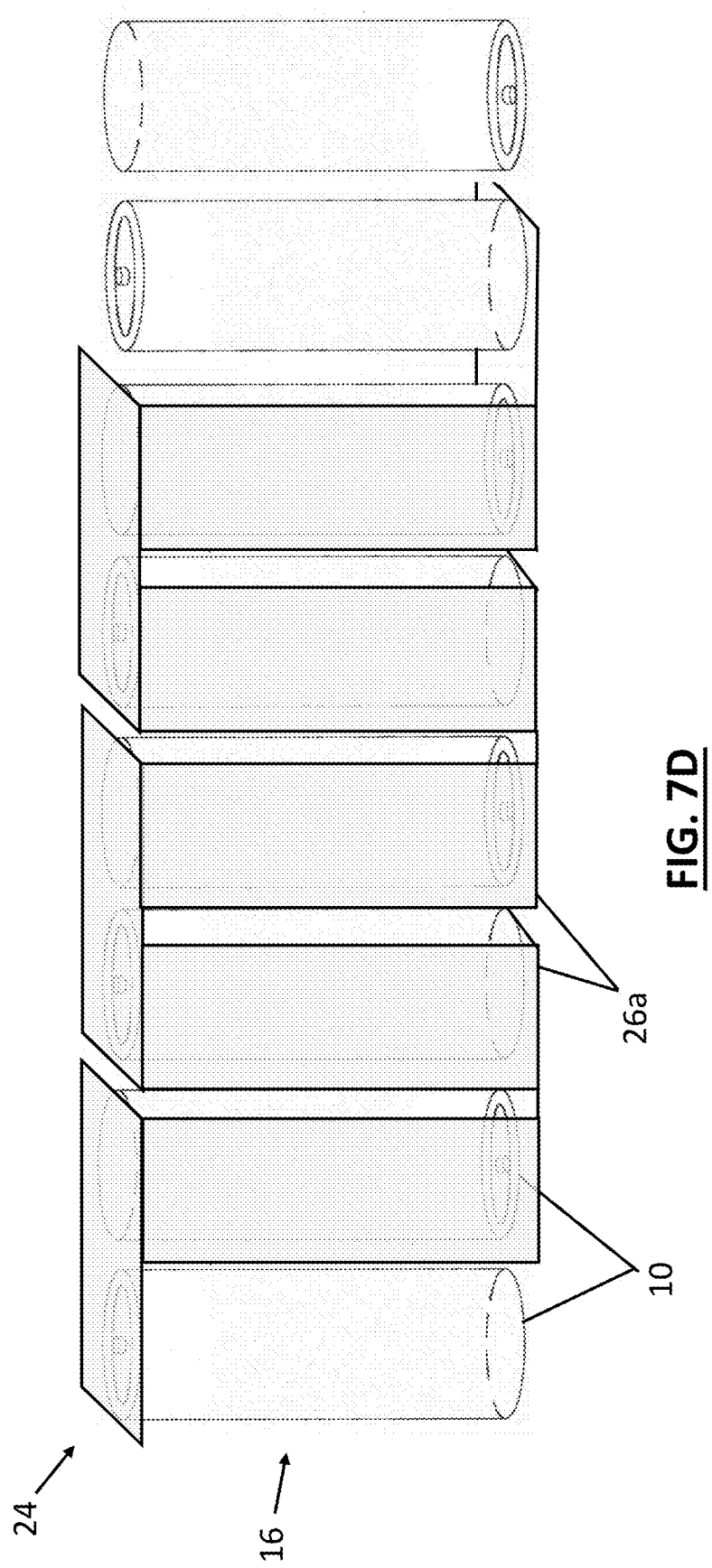
FIG. 7D is a schematic diagram showing sequentially reversed battery orientations in accordance with certain embodiments.

In addition to their electrical and mechanical function, in certain embodiments, some or all of the sides 28, 30, 32 and 34, are flexible enough to impart an overall flexible character to the conduit 24, so that it can assume compact coiled and other shapes as seen below. In other embodiments, the overall structure of the conduit 24 is rigid, and conduit links 26 and their connections to one another are inflexible. Provisions can be provided to maintain good electrical contact with the battery, as shown in FIG. 7C, wherein a conducting leaf-spring type of contact 35 exerts a bias toward the battery to ensure both the positive and negative terminals of the battery are in contact with the minor sides, or at least conducting portions such as 37 thereof. Of course forming a series connection of the batteries 10 of battery belt 16 for operation in a conduit can be accomplished in any number of ways. For instance, the battery orientations can be alternately reversed, as shown in FIG. 7D, with the conductivity and flexibility of the conduit links 26a and their sides adjusted accordingly.

Figure 8:
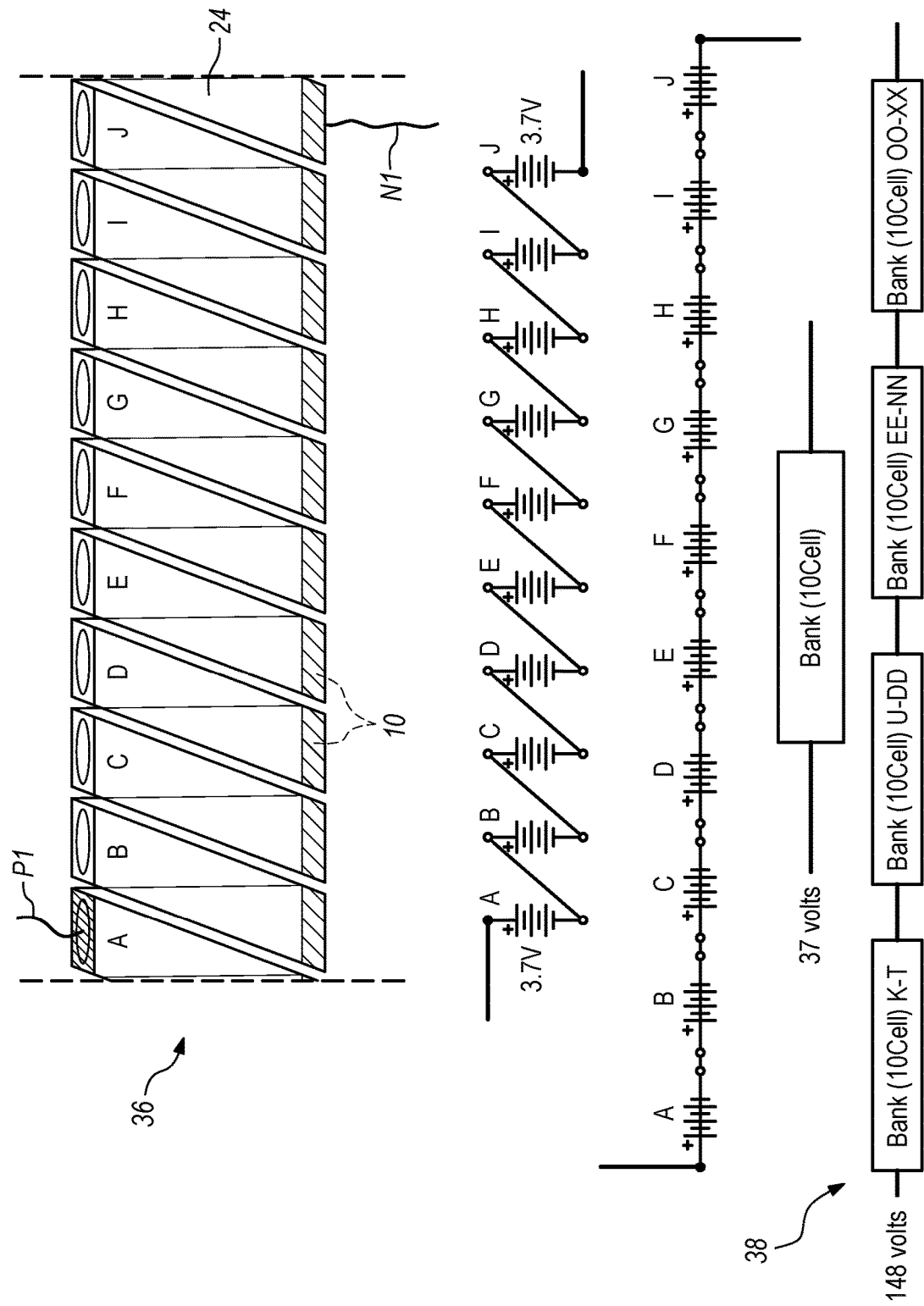
FIG. 8 is a schematic diagram of system for deploying series-connected batteries in an operational zone of conduit in accordance with certain embodiments.

As described supra, an effect of conduit 24 is to establish a series connection of the batteries 10 in belt 16 by connecting the positive terminal of each battery to the negative terminal of the next battery in the sequence; and by connecting the negative terminal of each battery to the positive terminal of the preceding battery in the sequence. A schematic illustration of this is provided in FIG. 8, which generally shows a system for deploying the batteries 10 of belt 16, for example for charging or discharging them. A conduit 24 establishes a series connection of ten 3.7 V batteries 10, designated A-J. The resulting 10-cell series-connected battery bank 36 has an output voltage of 37 volts at connections or taps P1 and N1, which may be collectively referred to as the output. By way of example only, four such 37-volt banks are shown in a series connection, resulting in a 148 V battery pack 38. The four banks thus connected can be constituted of four 10-cell battery belts 16 that are disposed in a single 40-link conduit 24, or four 10-cell battery belts 16 that are disposed in four corresponding 10-link conduits 24 connected in series.

Figure 9A:
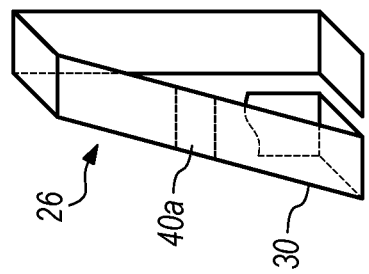
FIG. 9A is a schematic diagram showing a severable region of a major surface of a conduit link in accordance with certain embodiments.
Figure 9:
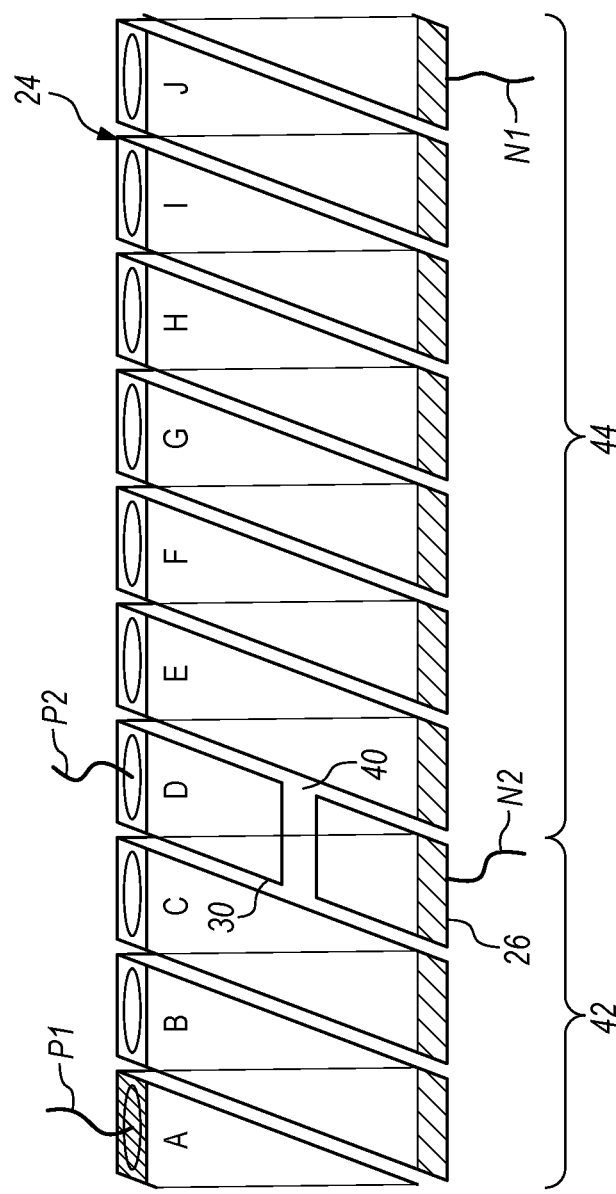
FIG. 9 is a schematic diagram showing a system for deploying the batteries by producing fractional outputs, or multiple operational zones, from a battery bank in accordance with certain embodiments.

FIG. 9 shows system for deploying the batteries by producing fractional outputs, or multiple operational zones, from a battery bank. In particular, a 10-cell bank of series-connected batteries A-J is disposed in a 10-link conduit 24, but with one of the links, 26, having an electrical gap or discontinuity 40 at electrode 30 thereof. With reference to FIG. 9A, the discontinuity can be selectively established by the user, for example when a pre-formed portion or region 40a of electrode 30 is removed, or is otherwise rendered electrically non-conductive. Each of the links in conduit 24 can have such a pre-formed region for selective removal by the user. The dotted lines defining the region 40a in FIG. 9A can represent perforations that facilitate removal of conductive material to establish the discontinuity. Returning to FIG. 9, electrical taps P2 and N2 are provided, which, operating together with the discontinuity 40, yield two separate power supplies: 3-cell power supply 42 (batteries A-C), having an output of 3.7 V×3=11.1 V at taps P1-N2; and 7-cell power supply 44 (batteries D-J), having an output of 3.7 V×7=25.9 V at taps P2-N1.

Figure 10:
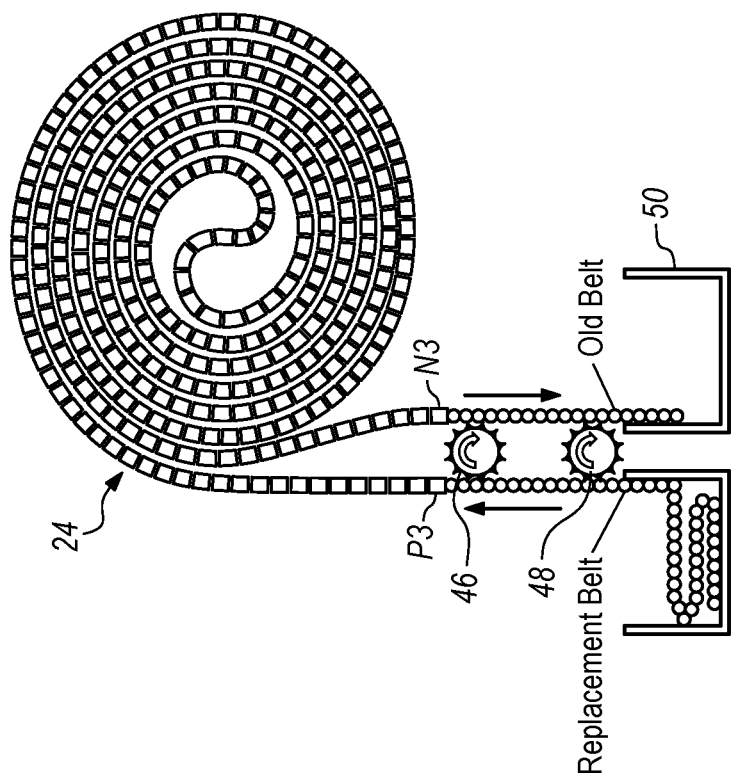
FIG. 10 is a schematic view of a system for deploying batteries that provides rapid battery change-out capability in accordance with some embodiments.

FIG. 10 is a schematic view of a system for deploying batteries that provides rapid battery change-out capability in accordance with some embodiments. Battery conduit 24 is shown in a coiled configuration and has a capacity of N batteries. One or both actuators 46 and 48, which in this example are sprockets that can be rotated in either direction, operate as powered drivers to simultaneously feed in a replacement battery belt, while extracting the old battery belt. The replacement and old belts are as previously described, and each has N batteries, such that for 3.7 V batteries, the voltage output at the P3-N3 nodes when a battery belt with N batteries is fully inserted is 3.7*N volts. The battery belts can be stored in bins 50 when outside the conduit 24. The conduit 24 may be a separable component from the actuators 46 and 48, such that conduit may be disposed at one installation, for example a charging station or electric vehicle, to which the actuators are brought by an operator for purposes of performing a battery belt change-out, and then removed from the installation. In certain embodiments, one or both actuators 46 and 48 are powered by motors (not shown). In certain other embodiments, neither actuator is powered by a motor, and the actuators are mounted for free rotation. Battery belt motion through conduit 24 in the latter configuration is powered by the operator, for example by pulling on the old belt, which causes drawing in of the new replacement belt, either because it can be linked to the old belt by a linking battery or link as described above, or because of the action of one or both actuators 46, 48, which engage the replacement belt and propel its motion into the conduit 24.

The rapid change-out configuration of FIG. 10 permits replacement of battery belts in the field, for example at an installation such as a charging station at which the conduit 24 is disposed, so that a replacement belt of depleted batteries can be inserted for charging through the P3-N3 nodes, and a charged ("old") belt with fresh batteries can be extracted for use, for example at a second installation such as an electric vehicle (not shown) that may be similarly equipped with a rapid change-out system, but with the output nodes thereof connected to the drive system of the vehicle. The vehicle may have multiple such rapid change-out systems, in a coil or other configuration, that can be connected in any suitable power extraction manner (for example series, parallel, fractional, etc.). In certain embodiments, rapid change-out can further be served by configuring the conduit to have a "zipper" form, whereby it is separable and reconnectable into two longitudinal halves, 33a and 33b, as shown in FIG. 11A. Such a configuration enables quick release of the battery belt from the conduit. The conduit links can be provided with suitable fasteners (not shown) that engage and disengage with one another to permit the zipper-like performance.

Figure 11:
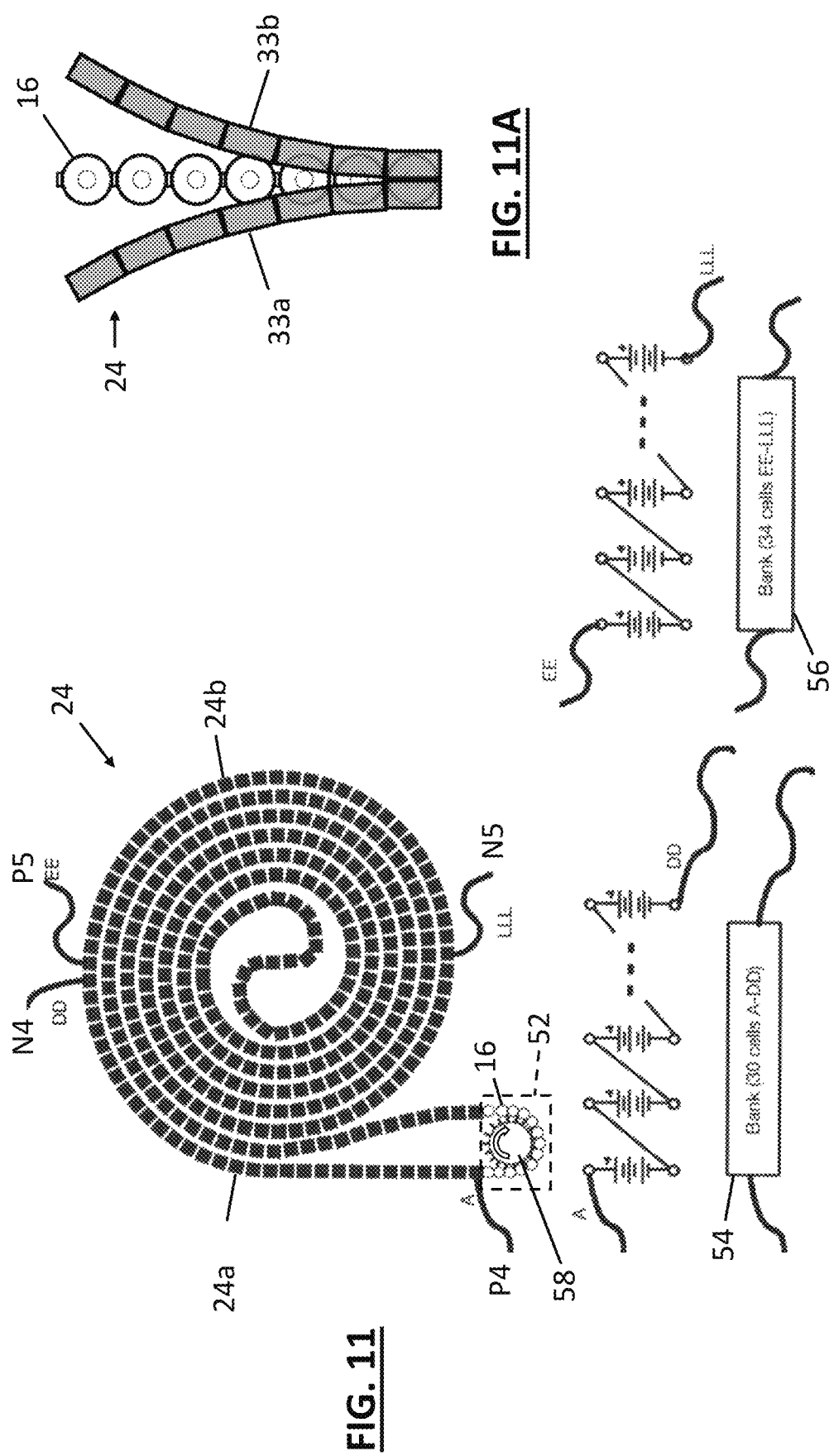
FIG. 11 is a schematic view of showing a variation of a system for deploying batteries that provides rapid battery change-out capability with fractional output and multiple operational and/or rest zones in accordance with some embodiments.

FIG. 11 is a system for deploying batteries having a coiled fractional output configuration in accordance with certain embodiments. Battery belt 16 has an "endless" configuration, and includes B total batteries mechanically linked together as described above. Belt 16 is housed in conduit 24 having N conduit links each defining a battery chamber, also as described above. The number of total batteries B exceeds the number of conduit links N by an excess battery amount $B_E$. That is, $$B_E = B - N$$

The excess batteries $B_E$ are accounted for in access region 52. Because the batteries in this region are outside of conduit 24, they are more accessible and can be easily replaced, for example when they have failed or they are underperforming. A battery exchange can be implemented in this region by simply sliding an individual battery out of the belt axially as described in FIG. 5, or laterally as described in FIG. 6, and replacing it with a new battery in reverse manner. Battery monitoring and replacement are discussed in more detail infra.

Conduit 24 as shown in FIG. 11 is electrically comprised of two segments, 24a and 24b, which are isolated from one another by a discontinuity, such as gap 40 in a conduit link 26 as described in FIG. 9. This results in a first battery bank 54 of 30 cells A-DD (111 volts); and a second battery bank 56 of 34 cells EE-LLL (125.8 volts). The two banks, each connectable for operation at nodes P4-N4 and P5-N5, respectively, can independently and/or simultaneously undergo charging or discharging depending on the application. The total number of batteries that are connected for operation in this manner, referred to as $B_O$, is 30+34=64. The number M of conduit links (and corresponding chambers) of conduit 24 exceeds the number $B_O$=64 of operational batteries. This excess of conduit links can be expressed as $$M_E = M - B_O$$

The excess conduit links ME can be used to hold batteries on stand-by, in resting mode, for example for cooling a portion of the batteries while those in banks 54 and/or 56 are being utilized for charging and/or discharging (operational mode). The batteries can thus be cycled into position in conduit 24 by motorized actuator 58, which can be coupled to one or more battery temperature or other parameter sensors, a timer, or other device (not shown) for providing feedback and triggering the rotation of the actuator. Logic and position encoders (not shown) can be provided to determine the number of positions the batteries of battery belt 16 should be shifted in conduit 24 through action of motorized actuator 58. The conduit 24 may be a separable component from the actuator 58, such that the conduit may be disposed at one installation, for example a charging station or electric vehicle, to which the actuator 58 is brought by an operator for purposes of performing a battery belt change-out, and then removed from the installation. A change-out would entail removal of one of the batteries 10 at the access zone 52, severing the battery belt 16 and enabling its removal and replacement in the manner described above in connection with FIG. 10.

Figure 12:
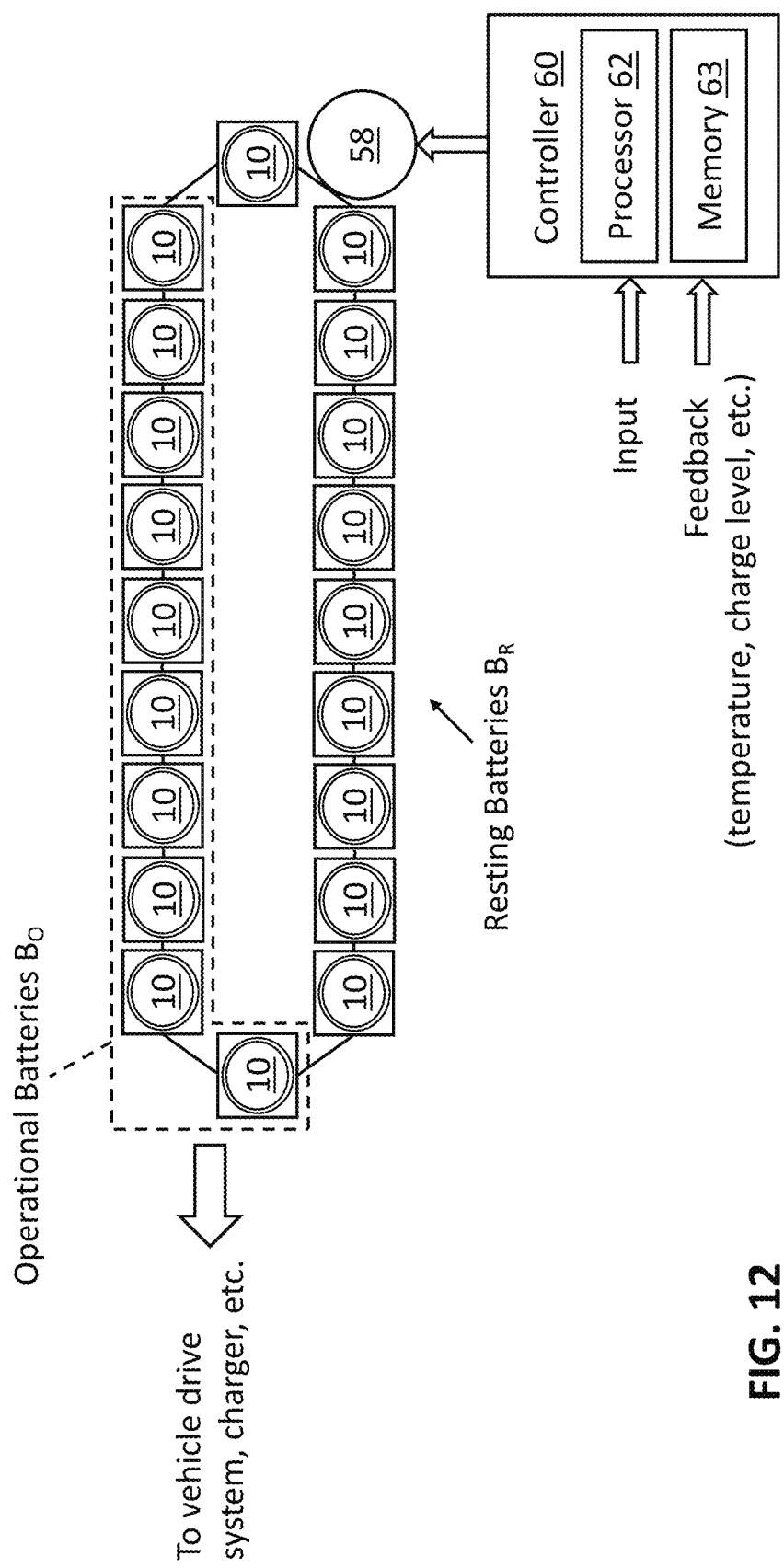
FIG. 12 is a generalized view showing a battery control system for use in a deployment system in accordance with certain embodiments.

A generalized view showing a battery control system for use in a deployment system is schematically provided in FIG. 12. A controller 60 can include a processor 62 for receiving the feedback information and other input and implementing the logic, with the controller activating the actuator 58 accordingly. A memory 63 in the controller can store various operating information that can be used to track movement of the belt 16 and to track positions or chambers therein, as detailed further below. Acceptance thresholds for various parameters, relating to temperature, voltage, current, power, and so on, can also be stored in memory 63. Actuator 58 is rotatable bi-directionally, depending on the cycle and the application. The dashed lines delineate an active or operational zone encompassing a set of batteries $B_O$ that are connected for operation, as part of one or more independent battery banks, while the remaining batteries BR outside the active zone are at rest, in a resting zone, for a cooling cycle for example. Operation can entail a connection to a charging system for charging the batteries, for example one sub-group at a time, in the case of limited charger capacity, until the entirety of the batteries are charged; or to a discharging system such as a drive system including an electric motor of a vehicle, and so on. At an appropriate time, sensed temperature, or charge/discharge level, power, current, voltage, or any other suitable shifting parameter, the controller activates actuator 58 to shift all or some of the batteries in order to move resting batteries into operational mode (into the active zone), and move operational batteries to resting mode (out of the active zone). While the ratio of operational batteries to resting batteries is shown to be 1 ($B_O/B_R=10/10=1$) in this example, other ratios greater than or less than one are contemplated. As mentioned above, sensors embedded in the conduit 24 can be provided as part of a temperature management system providing feedback information to controller 60.

Figure 12A:
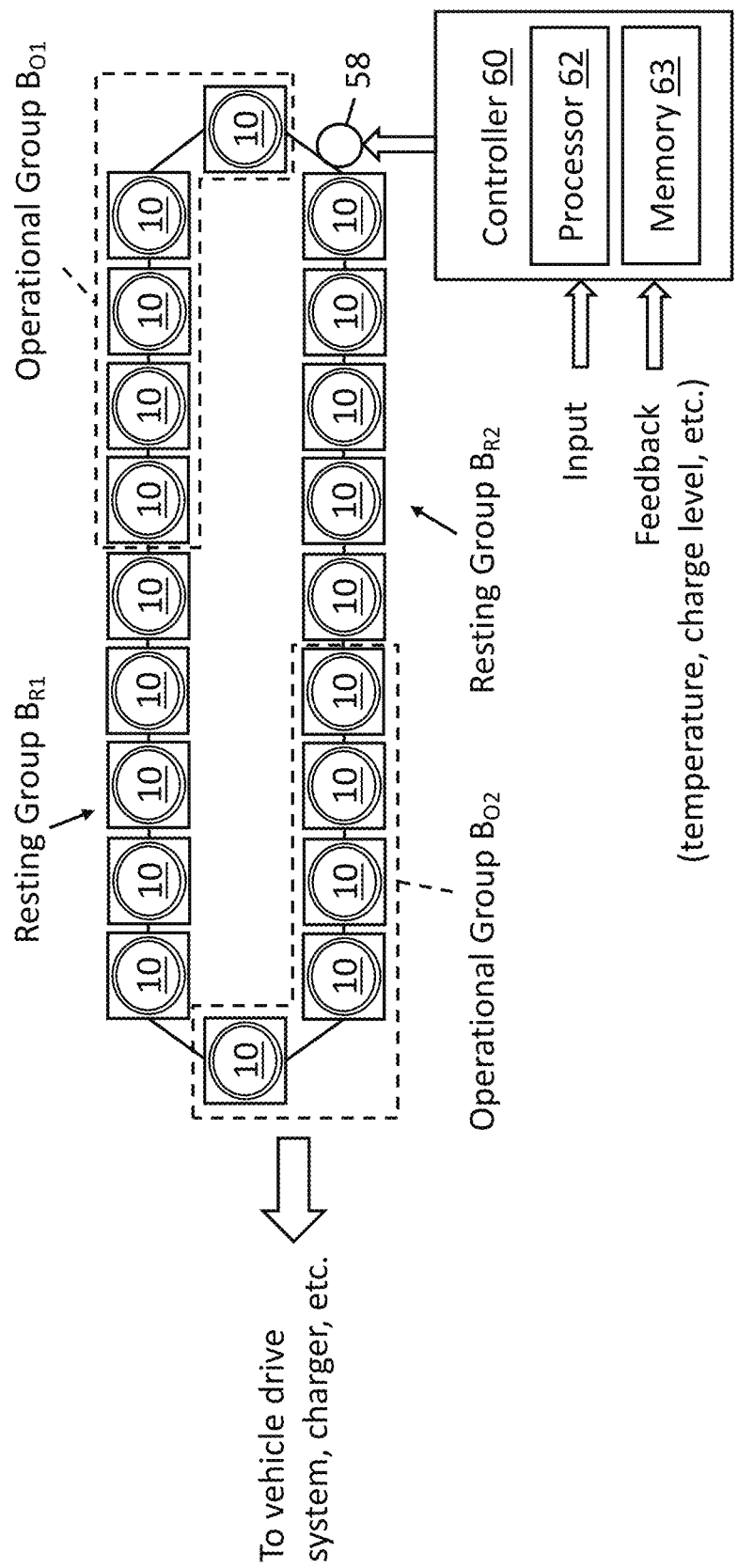
FIG. 12A is a variation showing a generalized view of a battery control system for use in a deployment system in accordance with certain embodiments, in which four 5-battery groups are used.

In the variation of FIG. 12A, four 5-battery groupings are achieved: two resting groups $B_{R1}$ and $B_{R2}$; one charging operational group $B_{O1}$; and one discharging operational group $B_{O2}$. Actuator 58 can be activated by controller 60 to shift the batteries S places every n minutes, or whenever the temperature of any one or more batteries in any of the groups reaches a prescribed threshold, or whenever a discharging battery level (voltage, current) or a charging battery level reaches a prescribed threshold, or based on any combination of these and other factors. In addition, depending on where the system is installed, the controller 60 can receive input from a battery charger, or from a controller of a vehicle in which the system is disposed, and perform the battery shifting in response to this input. The number of shifts S can be any integer greater than zero. In the example of FIG. 12A, a 5-place shift would invert the battery configuration, placing all the operational batteries in rest positions, and all the resting batteries in operational positions. This may be referred to as a 180-degree phase shift. Different degree phase shifts are also contemplated. A 90-degree phase shift would place half the operational batteries in rest positions, and half the resting batteries in operational positions, and so on.

In the arrangements as described herein, the mobility of the batteries 10 relative to the tap points from which they are deployed for charging or discharging confers important advantages in leveling out the stress and wear on the cells in the battery pack, and increasing their useful life. In particular, in conventional battery packs, the position of the cells is static, both physically and electrically. Since current flux (draw on discharge and the opposite on charge) and thermal flux (heating on charge and discharge) that cells experience differ as a function of their position in the circuit, those that are in one position (for example at the edge of the battery pack, at the tap point for charge/discharge) will experience different thermal, chemical and mechanical stresses than those at another position (for example at the center of the pack) during operation. Similarly, the physical position of cells relative to the cooling system employed (including ambient cooling) in the pack will also be different, such that even when a heat exchanger system is employed, its cooling will likely be uneven—for example more cooling at its inlet than its outlet—and some cells will benefit less from the cooling than others. This stasis of the physical and electrical positions in conventional systems results in uneven wear of the individual cells and premature failure of the cells and battery pack. The dynamic arrangements described herein obviate these problems, providing wear-leveling by rotating the batteries so that the stress positions (thermal, electrical, mechanical, chemical) in the pack are not occupied by the same batteries all the time, but are shared by the batteries as they are rotated into and out of these positions.

Figure 13:
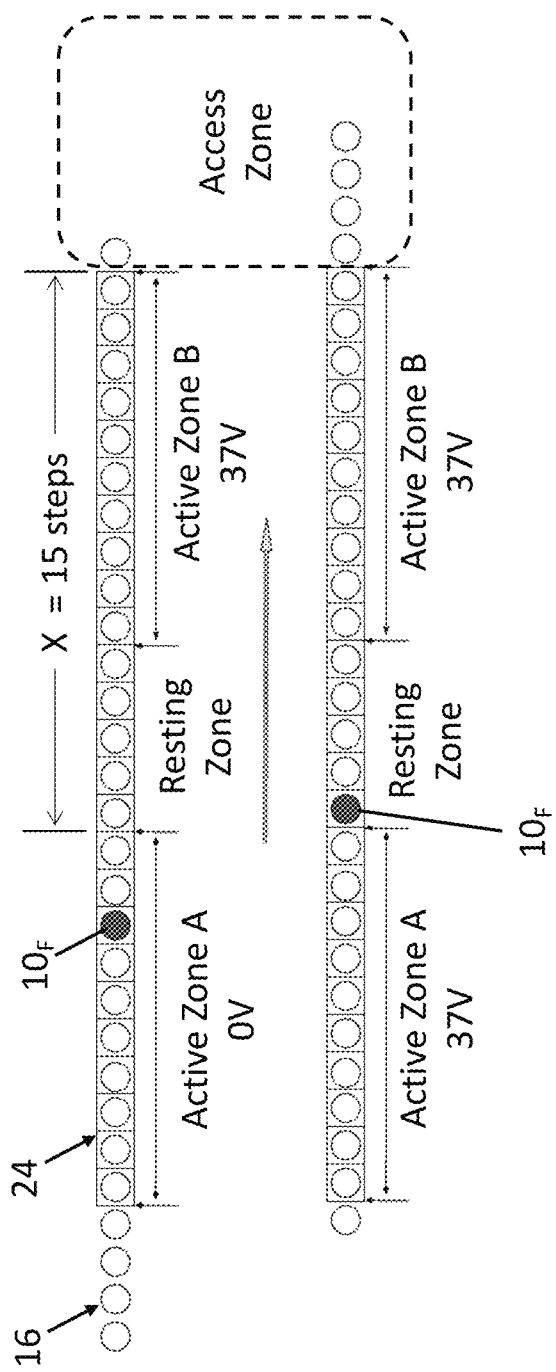
FIG. 13 is a schematic view showing a procedure for detection, shifting, and replacement of an underperforming battery in accordance with certain embodiments.

An additional advantage of certain embodiments is easy removal and replacement of failed or underperforming batteries. Detecting such batteries can be done on an individual battery test basis, wherein the controller 60 (FIG. 12) can cycle the batteries of the belt 16 through an access zone 52 equipped with temperature, voltage, current, and other sensors, and those batteries that fail certain criteria are replaced. In some embodiments, for a series-connected bank of batteries, a failure of one or more batteries in the bank will yield a zero voltage across the entire bank without identifying the specific failed battery. A simple approach to identify the failing battery in such a scenario is described with reference to FIG. 13. The failed battery $10_F$ of battery belt 16 is sequentially stepped through the conduit 24 by the controller 60 (FIG. 12) and enters active operational Zone A (upper drawing in the figure). Operational Zone A will exhibit an uncharacteristically low (zero) voltage as long as the failed battery $10_F$ is within it. This uncharacteristically low voltage, or any other parameter relating to Zone A that indicates a malfunctioning battery within it, can be sensed by appropriate algorithms in controller 60, or by sensors providing their output to controller 60. After three shifts (lower drawing in the figure), or steps, of battery belt 16 to the right, the failed battery will depart Zone A, and the voltage (or other suitable parameter) of Zone A will be restored to 37V. At this third shift, because of the restoration of the voltage to 37V, the identity of the offending battery becomes known to the controller, which then registers this battery as one requiring replacement. Registering the battery as such can simply mean tracking in memory 63 the battery chamber or location as one that contains a defective battery, or tracking the belt position, and so on. The controller 16 can then advance the battery belt 16 until the registered defective battery ($10_F$) reaches the Access Zone for replacement, either manually or by an exchanger as further detailed below. The controller 60 knows the distance X, in number of steps, from the end of Zone A to the Access Zone, which in this example is fifteen steps or positions. Such distance X is pre-stored in memory 63. The controller 60 advances the battery belt fifteen steps to deliver the battery $10_F$ to the Access Zone.

Figure 14:
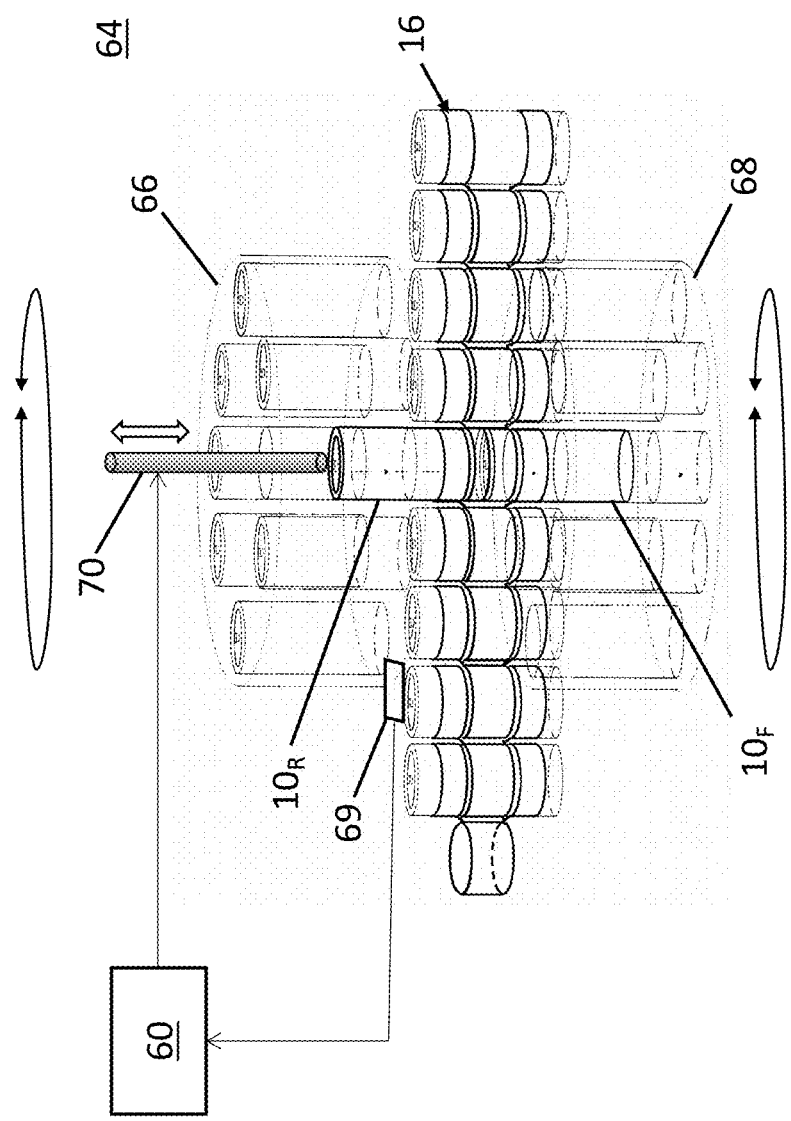
FIG. 14 is a schematic diagram of an automatic battery exchanger 64 that may be disposed in an access zone in a battery deployment system in accordance with some embodiments.

FIG. 14 is a schematic diagram of an automatic battery exchanger 64 that may be disposed in an access zone in a battery deployment system in accordance with some embodiments. The exchanger includes a fresh battery reservoir 66 and a depleted battery reservoir 68. As the battery belt 16 is stepped through the exchanger under control of controller 60, a battery $10_F$ that has been earmarked for replacement reaches alignment with a fresh replacement battery $10_R$. A push rod 70 is then actuated, forcing the replacement battery $10_R$ to occupy the position of battery $10_F$ in the belt 16, and forcing the battery $10_F$ out of the belt altogether and into the depleted battery reservoir 68. In some embodiments, the push rod 70 only acts on a battery in the belt, without pushing a replacement battery into its place. In this manner a battery is removed from the belt 16, and the belt is automatically severed in the manner described above. In some embodiments a sensor 69 is included, for example with the exchanger 64, for detecting parameters such as temperature, voltage, or current of batteries as they pass on belt 16. The sensor output is provided as feedback to the controller 60 as described above.

In certain embodiments, one or both reservoirs 66 and 68 are rotatable, in either direction (shown by the circular arrows), for example under control of a controller such as controller 60. The rotation of reservoir 66 enables the selective placement of batteries 10 in position for insertion into the belt 16. For example, after a first replacement battery is inserted into a position in the belt by action of the rod 70, the reservoir 66 is rotated to place a second replacement battery in position for insertion into the belt. The belt 16 of course is shifted any number of steps (one or more) to the new location that needs to receive the second replacement battery. Push rod 70 is then actuated again, and the second replacement battery is pushed into position in the belt, replacing the battery already at that location in the belt. Similarly, the rotation of reservoir 68 enables the selective placement of empty slots in the reservoir for receiving the batteries being replaced.

In certain embodiments, instead of recharging, batteries can be swapped out, singularly or as entire packs or entire belts, based on their state of charge or other factors, and replaced with fresh batteries. Those are that are swapped out can still carry sufficient charge for other tasks, reducing the number of charge cycles they are subjected to. Since battery cells only have a certain number of charging cycles in their lifetime, it may be advantageous to thus avoid recharging them unnecessarily. For example, in some situations an owner of an electric vehicle can charge his/her batteries at home, at work, everyday unnecessarily. If they have a 300-mile range and drive 50 miles to and from work they may nevertheless recharge the batteries even though they will likely drive only 50 miles tomorrow. They are unnecessarily expending charge cycles. If the owner has the option to swap batteries the range anxiety is addressed and the owner makes better decisions on when it makes sense to charge.

Moreover, in certain embodiments, a central leasing service that swaps the batteries in place at night, or a conditioning center run by a central service, these batteries that are slightly discharged can be placed in another vehicle that does not need to have a guaranteed maximum range and the service can save a charging cycle or several charging cycles on their batteries. Conditioning centers are discussed in more detail below.

Figure 15:
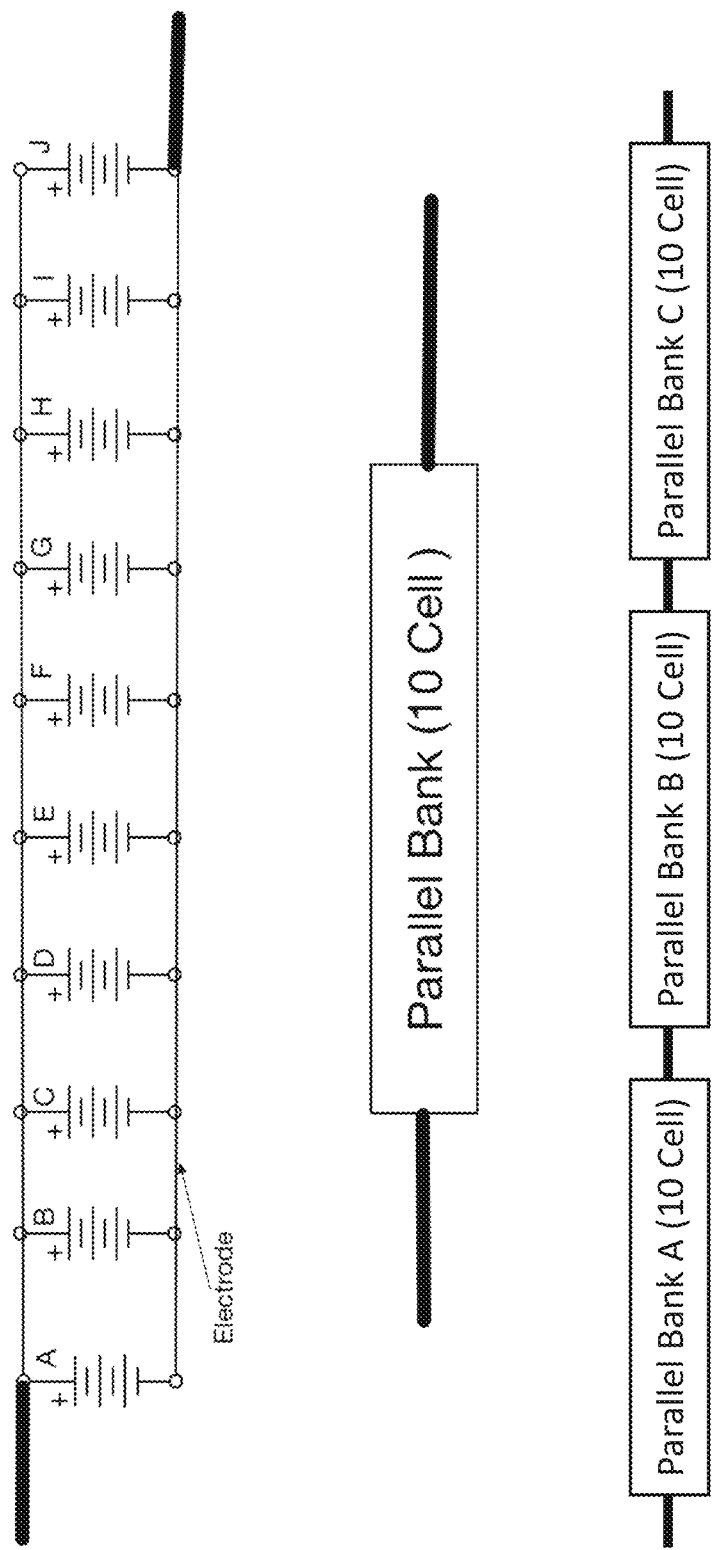
FIG. 15 is an electrical schematic of a parallel-connected battery bank, and a parallel/series combination of battery banks, in accordance with certain embodiments.
Figure 16:
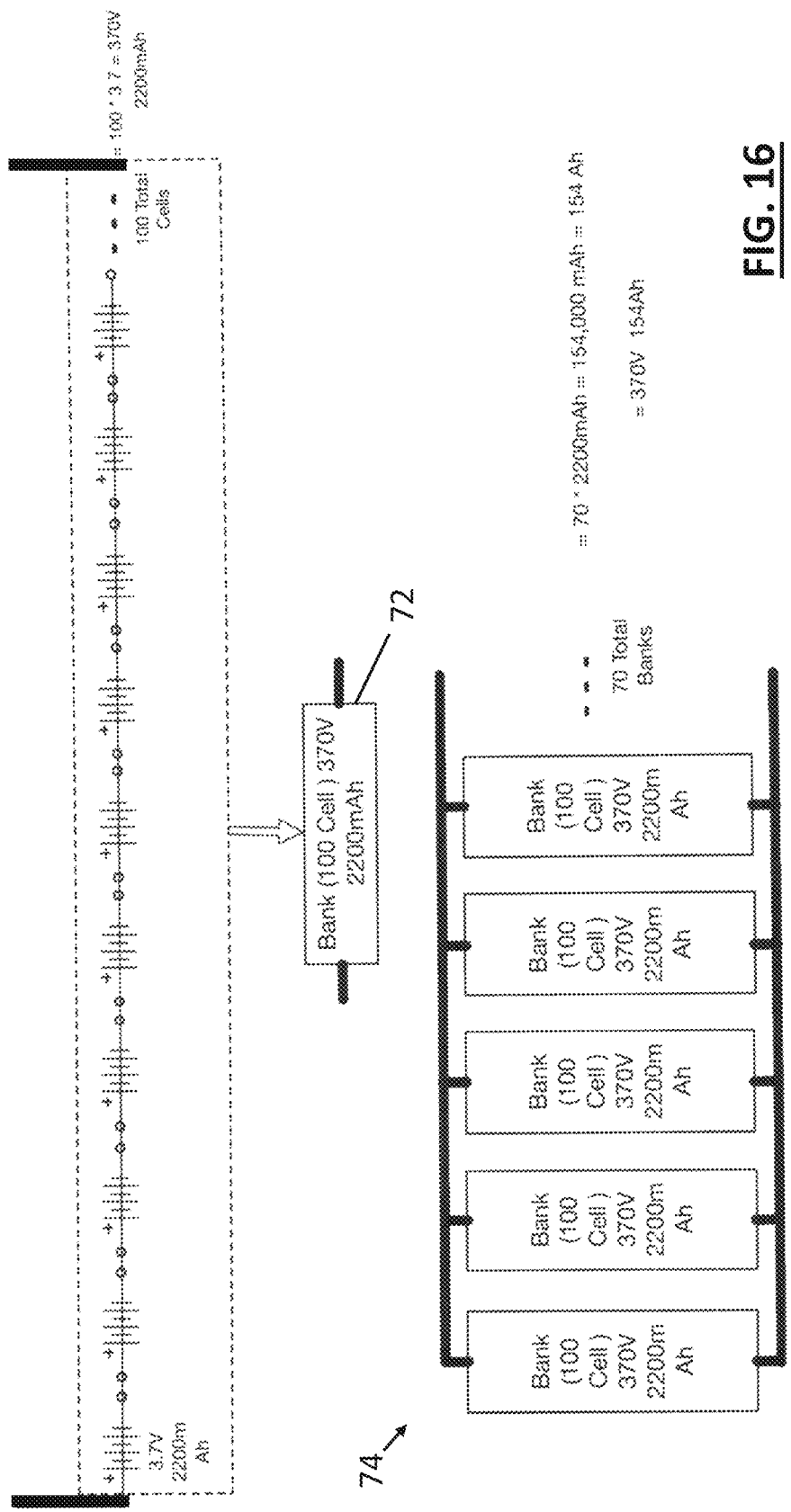
FIG. 16 is an electrical schematic of a combination series/parallel arrangement in accordance with certain embodiments.

In certain embodiments of a battery deployment system, parallel battery connections, or combinations of parallel and series battery connections, are contemplated. In a series connection, the total voltage of a battery bank is a multiple of the individual voltages; in a parallel arrangement, the total voltage across a battery bank is the same, regardless of the number of batteries in the bank, but the current is a multiple of the individual battery currents. A parallel bank is illustrated in FIG. 15, wherein 10 batteries, each rated at 3.7 V and 2200 mAhr (milliamp hours), are connected to yield a power supply of 3.7 V and 22 Ahr. A combination parallel/series arrangement is shown in the lower portion of FIG. 15, wherein three parallel banks A-C are connected in series with each other. While the banks have ten cells each, the number of cells in each bank can be different and can vary from bank to bank. A combination series/parallel arrangement is shown in FIG. 16. A series-connected bank 72 consists of 100 batteries, each rated at a voltage of 3.7 V and a current of 2200 mAh. The total rating of the bank 64 is 370 volts at 2200 mAh. Connecting 70 of these banks 72 in series yields a power source 74 rated at 370 volts at 154 Ah.

Figure 17:
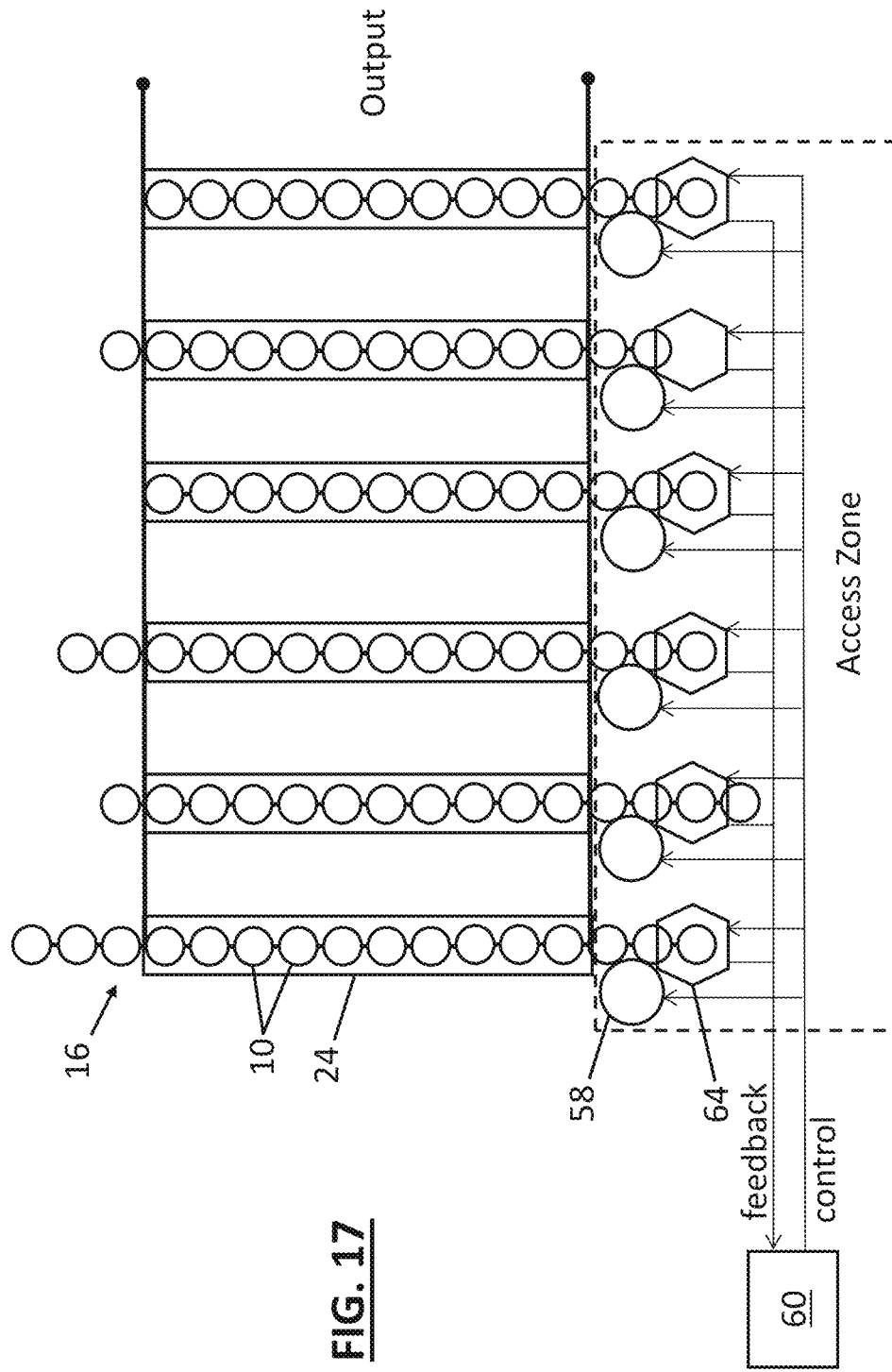
FIG. 17 is a schematic diagram of a battery management system for use in a battery deployment system in accordance with some embodiments.

A battery management system for use in a battery deployment system in accordance with some embodiments is shown schematically in FIG. 17. Each of six belts 16 of batteries 10 is shown in a corresponding conduit 24. Each of the six conduits establishes a series connection of the ten batteries therein. The conduits are connected together in parallel to provide a combination series-parallel connection output, for example for driving an electric vehicle, or for connection to a charger for charging the batteries. In an alternative configuration, one or more of the six conduits 24 is not connected to the others, so that a different, independent electrical circuit is established. Such an alternative arrangement permits a "hot swap" of some of the batteries, wherein some batteries can be swapped out while others continue to be connected and operational, for example to drive a motor or to be charged.

Controller 60 drives six corresponding actuators 58 independently of each other in order to cycle the batteries in the six belts through resting zones for cooling, or through operational zones for charging and discharging, as described above. Multiple operational zones may be present, each serving to establish an electrical connection to a charging, discharging or testing device or component. Some of these devices or components can be for example motors, chargers, compressors, heaters, blowers, other battery banks, inverters, timing devices, controllers, solenoids, radars, cameras, rotors, inductive loads, capacitive loads, fans, flywheels, thermo-electric coolers, thermocouples, sensors, HVAC, motor generators, actuators, solar devices, wind devices, lights, power electronics, appliances and so on. Controller 60 also drives six corresponding exchangers 64 independently of each other in order to selectively replace batteries in the belts 16 as necessary, for instance based on sensed temperature, voltage, current, and other parameters. Feedback from sensors 69 (FIG. 14) can be provided to the controller 60 to assist in its decision-making and control of the actuators 58 and exchangers 64. An advantage of the combination series-parallel connection of FIG. 17 is that it permits rapid change out of the series-connected batteries in each of the individual belts 16, while at the same time enabling a high current parallel connection of the belts 16 to each other.

A measure of battery discharge (or charge) relative to maximum capacity is C-rate. At 1C, a 100 Ahr battery discharges 100 amps of current for 1 hour. At 0.5C, the 100 Ahr battery discharges 50 amps of current for 2 hours for a total of 100 Ahr. At 4C, the 100 Ahr battery discharges 400 amps of current for 15 minutes for a total of 100 Ahr, and so on. The higher the C rate, the more demand that is placed on the battery, the greater the wear, and the shorter the overall life of the battery.

Nominally, most batteries should be charged or discharged at no more than 0.5C to minimize wear and stress and increase longevity. In addition, batteries should be at about 80% of their original charge condition, referred to as State of Health (SOH), in order to be used as power batteries for performance applications requiring discharging rates or charging rates of 1C or greater. Batteries below about 60% State of Health should be used with a charge/discharge rate of <0.5C. In addition, methods of stair stepping the charge/discharge intervals and using a pulsing charger or switched discharger similar to that used in motor controllers is envisioned. SOH generally is a measure of internal resistance, capacity, voltage, self-discharge, the battery's ability to accept charge, and the total number of charge-discharge cycles that the battery has completed at that point in time. Another term Depth of Discharge, which is how much the cell or pack energy will be used for the given application—nominally between 20% and 90% for lithium-ion, for example. It should be noted that lithium-ion batteries suffer from serious charging and discharging problems when they are below 25 degrees Celsius.

The arrangements disclosed herein can be used to maintain nominal C rates for batteries in a power pack. For example, battery belts can be loaded with batteries (or, more generally, energy storage devices) that have different energy storage characteristics (such as C rates) and that are selectively switched into an operational zone as a function of the anticipated current discharge (or charge) demand. The energy storage characteristics of a storage device may be or may not be fixed, and derive from many factors, including, but not limited to, its present state of charge, state of health, depth of discharge for a given application, its capacity, size, density, chemistry (internal electrolyte), format, form factor, mass, materials, voltage (open circuit and working), energy density, power density, peak power (charging/discharging), state of function (internal transients on charge and discharge), internal resistance, self-discharge, efficiency, current temperature, ambient (outside) temperature, thermal mass, humidity, atmospheric pressure, time of day/time of year (energy costs), characteristics of the load or charger to which it will be connected (impedance, inductance, capacitance, etc.), C rate capability or charge and discharge rate, and so on. For example, different types of batteries, such as Lithium, Mercury, Lithium-Ion (Lithium cobalt oxide, lithium manganate, Lithium iron phosphate, lithium polymer, lithium nickel manganese cobalt), and NiMH, Nickel Cadmium, Alkaline, Lead-Acid, etc. have different energy storage characteristics, and even batteries of the same type can have different characteristics, depending for example on their format, temperature, and so on.

In a vehicle context, high-demand situations, such as accelerating from a traffic light or a parking space, could be used to trigger a battery shift, through motion of the battery belt in the conduit by operation of the actuators 58 and controller 60. The battery shift would place one type of battery, for example high-rated batteries, in the operational zone, coupled to the motor, to provide the required power. The high-rated batteries could be used to provide sufficient accelerative power even when discharged at 0.5C, whereas lower-rated batteries would need to be operated at deleterious rates greater than 0.5C to provide the same power.

Conversely, and also illustratively in the vehicle context, a bank of supercapacitors or rapid-charge batteries can be shifted into an operational zone for rapid charging, in order to spare more conventional batteries from the damaging high current of a speed charger. Similarly, in certain situations, such as regenerative braking, some batteries, such as ones that have been at rest, or such as supercapacitors, can be shifted into the operational zone to receive the current surge that may otherwise damage lower-rated batteries or those that were more recently being discharged and may be heated or otherwise unsuitable.

In another illustrative example, considering colder climates, lithium (as opposed to lithium-ion) batteries or other types of energy devices that perform well at lower temperatures, can be shifted into operational zones to power the motor when it is cold out, until other lithium-ion batteries in the battery belt warm up to their optimum use temperature range. More generally, entire battery layouts in the battery belt can be chosen for specific climate or performance requirements on a given day or season, or for certain driving conditions or terrain. The swap-out of the entire battery pack or portions thereof can thus be performed on a daily or seasonal basis using the rapid battery change-out capability discussed supra.

Battery shifting in and out of operational zones can also be effected based on economic considerations that may be selectable by the user or the system, for example in response to sensed driving and weather conditions, terrain (mountains, flats, etc.). In a vehicle, allowance may be made for using one area or bank of brand-new batteries for performance and one area of used batteries for cruising. The battery mix could also be changed based on the driver's common usage. In this way, the mix could provide the driver with the optimum cost/performance for their driving.

The cost, or economic, factor may be tied to the trade-in value of the batteries, with batteries that are operated at more stressful conditions (higher C rate for example) losing their trade-in value more rapidly over time. The operator can set maximum value conservation as a goal for the controller 60 to pursue, and algorithms in pursuit of this goal would guide the output of the controller in shifting batteries of the battery belt into the different operating and resting zones of the conduit depending on factors such as outside temperature, charge and discharge rates, battery type, battery age, and so on, as detailed above.

In certain embodiments, battery owners can be incentivized and rewarded financially for actions and behaviors that reduce battery stress and increase longevity. Battery charging stations, which can be used to charge a customer's own batteries or swap them out with replacement batteries, can also be operated as conditioning centers that base their charge, or rebate for swapped out batteries, on: type of battery—Sony™, Samsung™, unknown brand, etc.; State of Health (performance) 90%, 80%, 70%, etc.; current charge level (that the driver or customer has discharged/charged them to) 70%, 50%, etc. The price that the conditioning center charges is based on these and other factors, and an estimate can be provided to the user in in advance of pulling in to the conditioning center. The conditioning center could then test the batteries after they are swapped out of the user's car and the bill can then be automatically electronically debited from an account.

The factors upon which the cost is based can be determined on board the vehicle by a testing system to which the batteries coupled by shifting them in the battery belt to an appropriately connected operational zone. The testing system in the vehicle performs its testing under real conditions—under the applied use of the batteries. In certain embodiments, batteries can be charged/discharged individually based on testing results, in order to achieve certain optimal battery bank characteristics and overall performance profiles. This can be done at the conditioning center, or even on board a suitably-equipped vehicle. While conventionally most testing of batteries is done in a lab, in the arrangement described herein testing can be done while the batteries are in use in a specific vehicle with a specific mix of batteries with a specific class of user in a specific area and climate. This data can be very valuable to the conditioning center, as well as to battery and vehicle companies.

Drivers at a conditioning center can choose the battery mix they want based on what their current trip is going to be (long, mountainous, cold). In turn this could be determined for them based on their Google Maps destination or other telemetry information. In certain embodiments, batteries can be swapped between different types of drivers based what is known about their driving habits, history, routes, and other factors specific to them. For example, if one driver puts a heavy load on the batteries on their route or the way they drive, whereas another is an easy highway driver—whoever owns the batteries and is leasing them to these drivers can choose who gets which batteries based on how they can get them to last the longest, or stressed the least, and so on.

Figure 18:
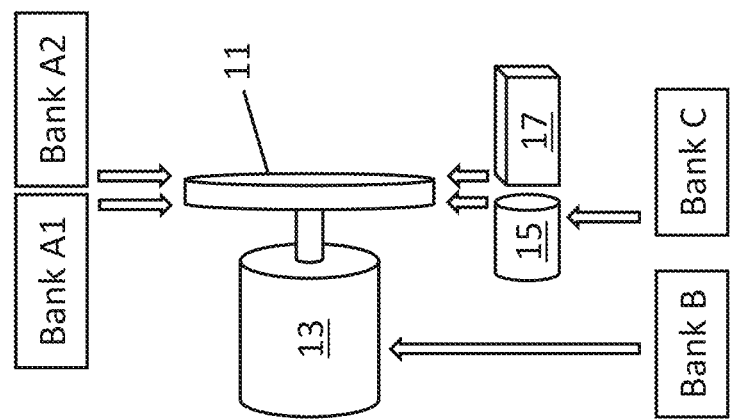
FIG. 18 is a block diagram showing the use of different banks of batteries with a motor and flywheel.

In certain embodiments, a vehicle driver can be given real-time tips in their car on how their driving affects the battery condition. Drivers can take steps themselves with their driving and charging habits to improve their cost/performance ratio. For instance, the driver could charge up sooner and save money by not running the batteries down completely, or below a certain level. They could then be rewarded with a lower cost at the conditioning center. Besides the selective shifting into and out of the operational and resting zones described above, measures to reduce battery stress and wear can include mechanical means. One example is a flywheel for storing energy. With reference to FIG. 18, a first battery bank (A1) with one type of battery or battery rating or battery state (from resting for example) or other energy storage characteristic can be shifted into an operational zone for powering up flywheel 11 from standstill; while a different battery bank (Bank A2) of another type of battery or battery rating or battery state or other energy storage characteristic can be shifted into an operational zone to maintain the spin of an already spinning flywheel, whose energy demands are lower. The flywheel can be useful for rapidly accelerating the vehicle when desired, sparing the batteries from having to perform this taxing task. Thus, the energy storage device (the flywheel, or similarly, supercapacitors or the like) is charged for use in situations that require a high current discharge such as in rapid or emergency acceleration. In this manner batteries are able to maintain a discharge rate of <0.5C while still providing the added sudden power when necessary. Maintaining a discharge rate of <0.5C significantly increases the lifespan of the batteries. In the example of FIG. 18, the electric motor 13 of the vehicle is driven by the batteries of Bank B for cruising, where the current of <0.5C can be maintained. For the initial acceleration from a stopped position, however, the batteries can power a small ancillary motor 15 that spins up the flywheel 11 slowly to draw as little current as possible. When acceleration is needed from a stopped position, the initial push and torque to the main drive (driveshaft) is taken from the flywheel and not the electric motor. The flywheel can use its momentum/inertia to get the car going from a stopped position. When braking, the flywheel can be spun up by the braking system 17 and maintain this momentum in the flywheel until for example a traffic light changes and the car is ready to move again from a stop.

In addition, it is possible to have other actions cause the system to spin up the flywheel 11 as well. For instance, engaging the turn signal can tell the system to spin up the flywheel in preparation for lane changing requiring acceleration. This would be utilized for lane changes and entrance to the highways from on ramps and merges. The driver could also learn additional actions like a light tap on the accelerator in advance to trigger the flywheel to spin up.

Figure 19B:
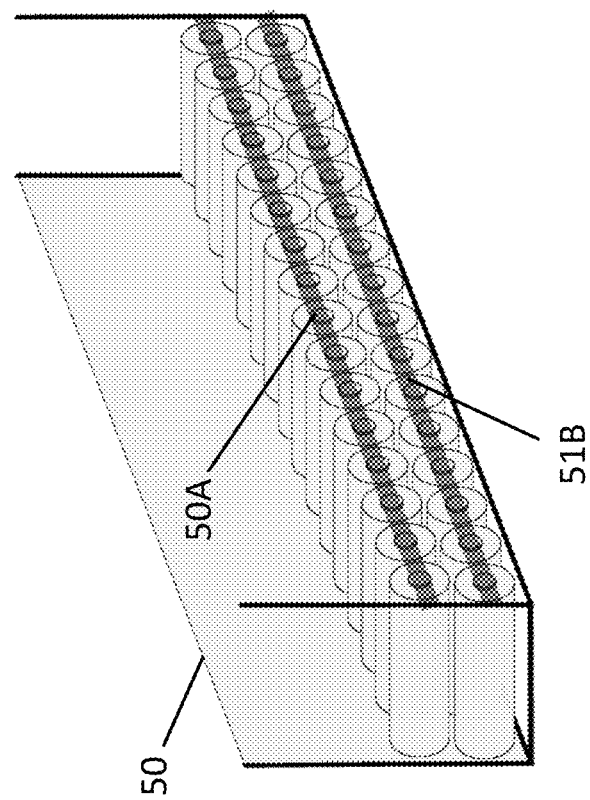
FIGS. 19A to 19C show a bin arrangement of a battery pack in accordance with certain embodiments.
Figure 19A:
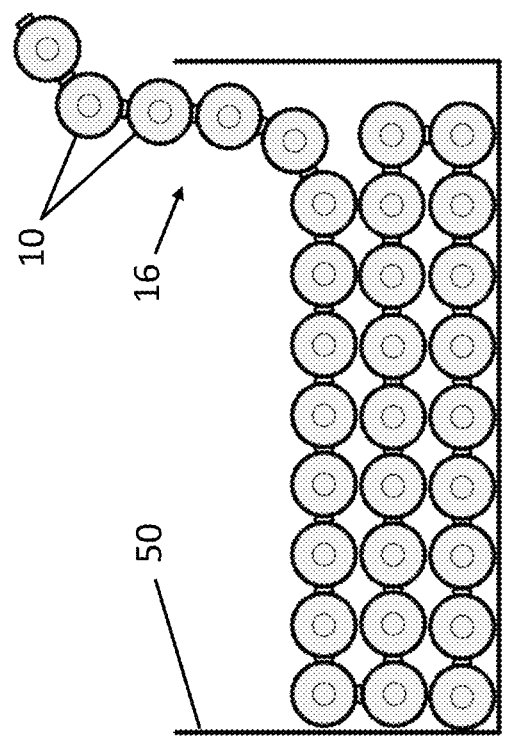
Figure 19C:
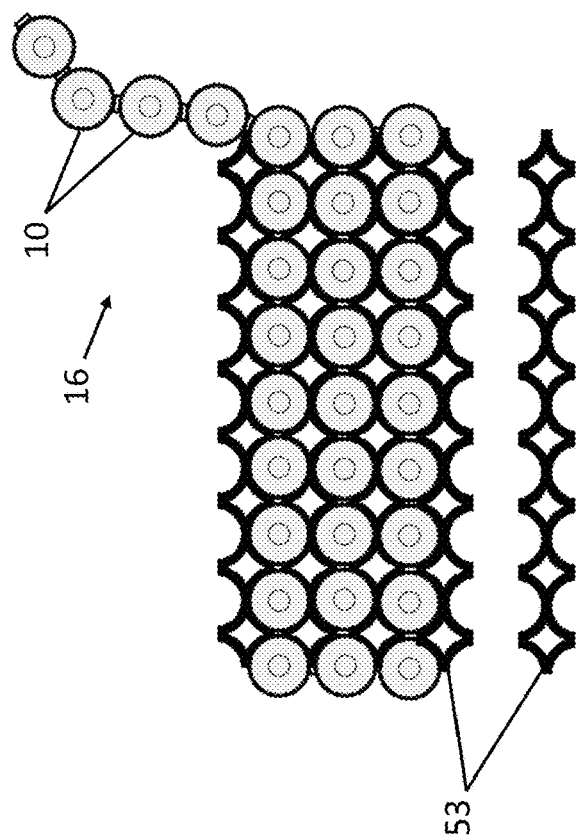

The arrangement of batteries of a battery pack can take many different forms. For instance, returning to FIG. 10, the bin 50 can itself be provided with contacts for establishing connections with the batteries 10 of the battery belt 16, and in this manner serve as a portable power pack, as shown in FIGS. 19A and 19B. Strip electrodes 51A and 51B are one example of such contacts that connect the positive nodes of a row of batteries together for a parallel electrical connection of that row. It should be noted that in such an arrangement the conduit can be dispensed with. Spacers 53 (FIG. 19C) can optionally be provided to hold the batteries in place, and to allow for air cooling or to accommodate cooling means therein (not shown)

Figure 20:
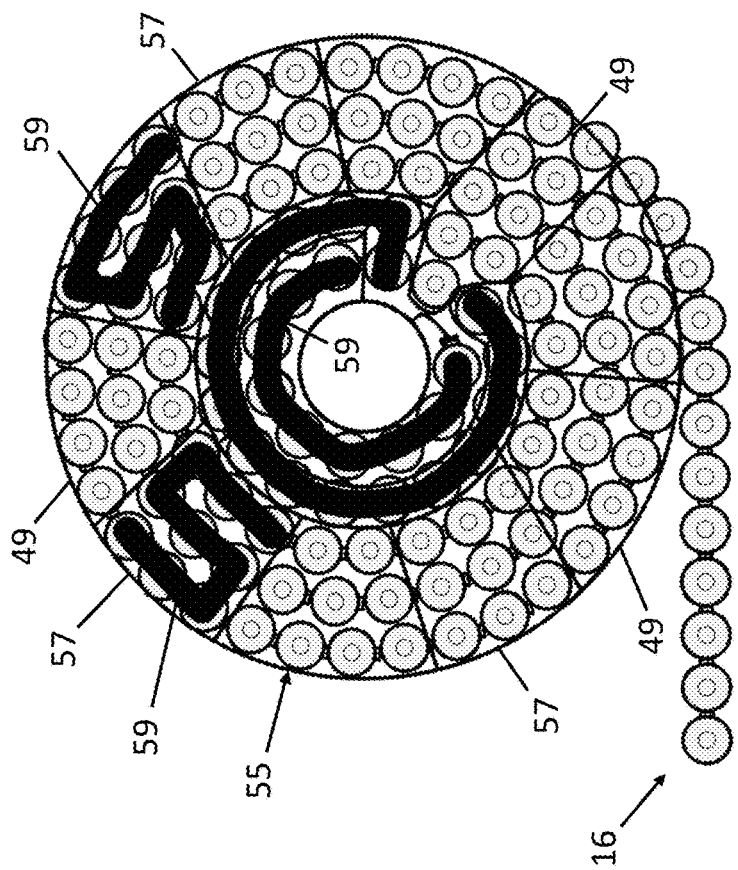
FIG. 20 shows a coiled arrangement of a battery pack in which the coil is disposed between a pair of plates in accordance with certain embodiments.

Another battery arrangement is show in FIG. 20, wherein the batteries are coiled between two opposing plates 55 (only one is shown in the plan view). The plates are shown to be round to substantially conform to the coil shape of the battery belt, but any other shape of the folded battery belt and plates is contemplated. The plates 55 may be divided into sectors 57, some of which have a suitable electrode pattern 59 to make a desired connection among a subset of the batteries, which may be referred to as a pack, to for example establish an electrical connection in the form of one or more operational zones and rest areas as described above. Two example rest areas are denoted 49 in the drawing. Such an arrangement dispenses with the need for a conduit, using the plates 55 and electrode patterns 59 to support the battery belt 16 and provide the electrical connections between batteries. It should be noted that portions of the patterns 59 can extend radially in the plate 55, connecting together batteries that may not be in sequential order in the battery belt 16.

Figure 21:
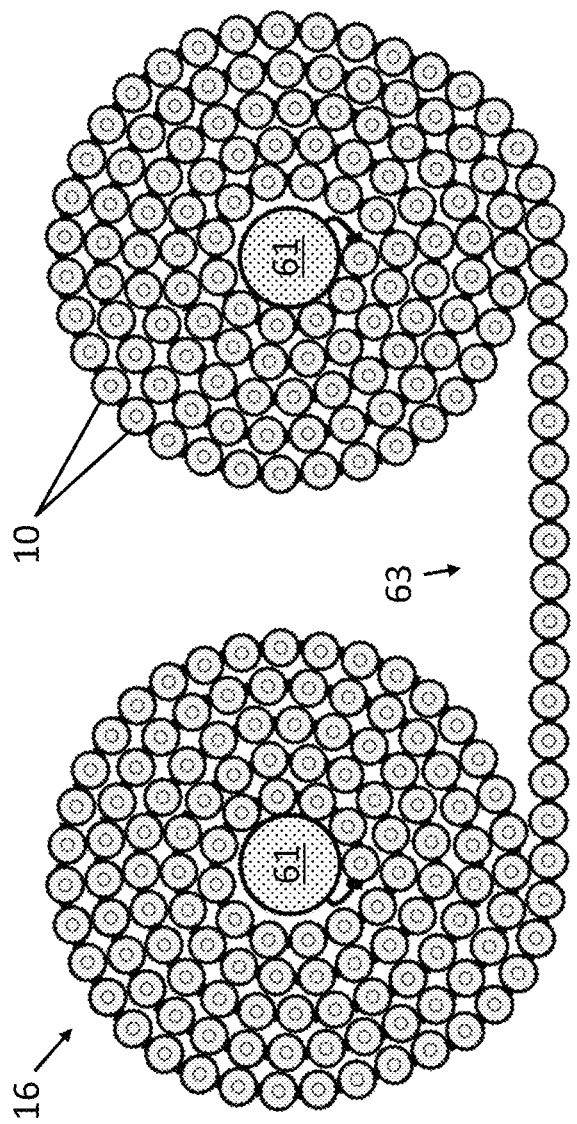
FIG. 21 shows a dual coil arrangement with the coils disposed around rotatable shafts in accordance with certain embodiments.

In another arrangement depicted in FIG. 21, the coiled battery belt 16 can be wound around a central shaft 61. Two such shafts are depicted, one or both of which may be coupled to a rotating means (e.g. motor, hand crank) (not shown) to provide motive power for winding. The batteries in one or both coils may be disposed between plates 55 (FIG. 20) for electrical connections in the manner described above. The region 63 between the coils can operate as a resting zone.

Figure 22:
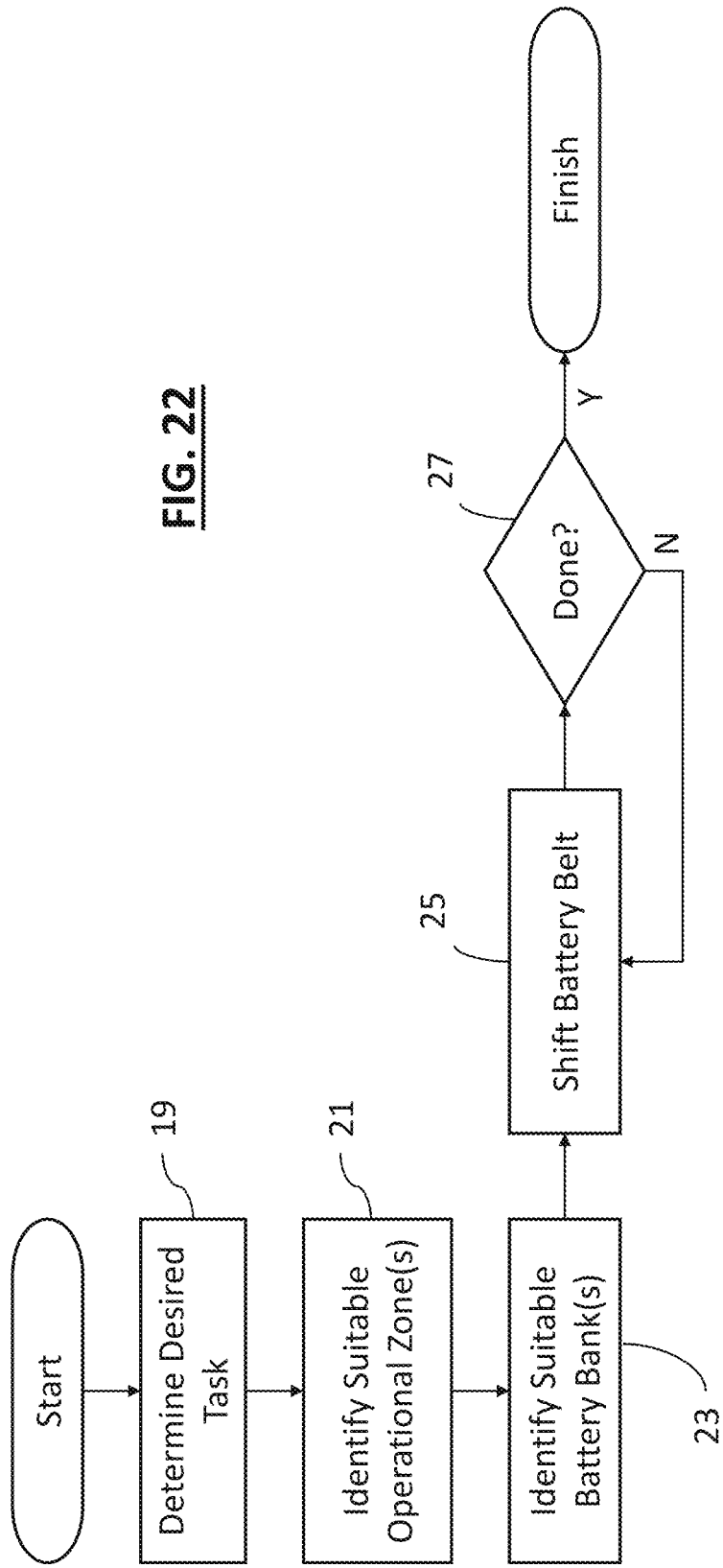
FIG. 22 is a flow diagram illustrating a process generally for matching batteries to a task to be performed in accordance with certain embodiments

FIG. 22 is a flow diagram illustrating the process generally for matching batteries to a task to be performed. In accordance with certain embodiments, this process is performed by controller 60, singularly or in conjunction with other modules (now shown). At 19, the task to be performed is determined. The task may entail charging, discharging or testing a bank of batteries (it is to be understood that "bank" means one or more energy storage devices, which can be any conventional batteries, or supercapacitors, or the like). Tasks can be any of those described above, including, but not limited to testing, slow charging, rapid charging, discharging for powering main motor for cruising, discharging for powering main motor for rapid acceleration, discharging for powering flywheel, discharging for powering ancillary motor for powering flywheel, and so on.

At 21, one or more operational zones are identified that are suitable for effecting the electrical connections suitable for performing the task determined at 19. For instance, if the task is to perform a battery rapid charge, then the operational zone that is electrically connected to a rapid charger is identified. If the task is to power the ancillary motor, then the operational zone that is electrically connected to the ancillary motor is identified, and so on.

At 23, the suitable battery bank for the task is identified. For example, if the task is to power the main motor for acceleration, then batteries in the battery belt(s) that are best suited for such a power surge, and that are sufficiently charged and cooled and in the proper condition to avoid any deleterious effects, are identified.

At 25, the identified suitable battery bank is shifted into position in the suitable operational zone. This is performed by instructions from controller 60 to actuator 58 to shift the battery belt 16 the appropriate number of steps to place the identified suitable battery bank in the operational zone.

At 27, a determination is made if the shifting is complete. If yes, the process ends; if no, a return to 25 is effected and the shifting continues.

Figure 23C:
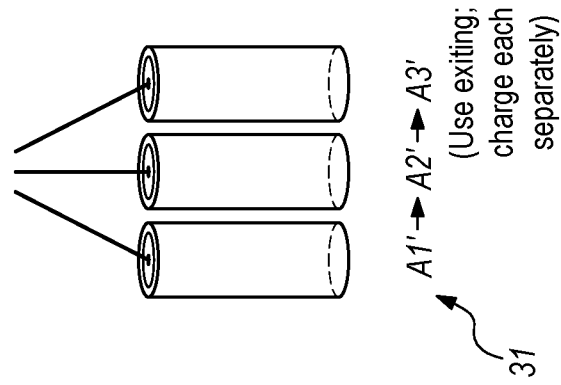
FIGS. 23A-C are schematic diagrams illustrating an approach for providing cells with different charge/cool/discharge/cool cycles in accordance with certain embodiments.
Figure 23B:
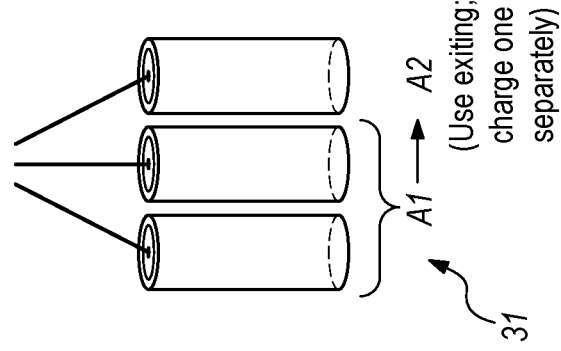
Figure 23A:
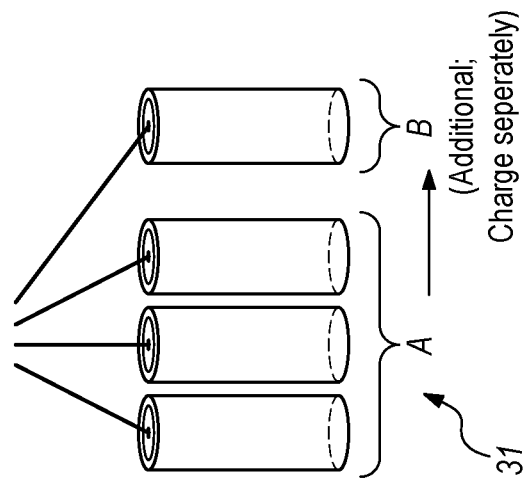

FIGS. 23A-23C are schematic diagrams illustrating an approach for providing cells with different charge/cool/discharge/cool (not necessarily in that order) cycles. This can be implemented using the arrangements described above, wherein the cells 10 of belt 16 are shifted by controller 60 into different operational zones to asynchronously effect their charging, discharging, and cooling. In one example embodiment, controller 60 selects, for each charge or discharge cycle of a battery having a pair of cells, only one of the cells for charge or discharge at a time. In certain embodiments, a method for operating a battery having first and second cells, includes operating the first and second cells on different charge/discharge cycles that are staggered in time, with each cycle including a cooling period following each charge phase and a cooling period following each discharge phase.

In FIG. 23A, a battery 31 has existing cell group A (three cells), to which a cell group (one cell) is added. The additional cell group B can be charged, cooled, and discharged on a different cycle than the cells of the existing cell group A. The addition of cell group B allows for a rapid redesign of existing configurations, such as cell group A, to relieve the load on the current system to prevent thermal loss and damage.

In FIG. 23B, showing a different embodiment, battery 31 is broken into subgroups A1 and A2. In group A1, two of the existing cells are placed on one charge/cool/discharge cycle; and in group A2, the third existing cell is changed to a different cycle, for example to prevent thermal loss and damage.

In FIG. 23C, each of the three cells of battery 31, respectively designated A1', A2', and A3', is placed on its own charge/cool/discharge cycle, different from that of the others, to for example prevent thermal loss and damage.

The principle behind the arrangements of FIGS. 23A-23C is to use different charging cycles for some cells of the battery so that all cells will not be charging and discharging at the same time, thus reducing the thermal cycle in the battery. Each embodiment can be expanded to a large number of cells that charge/cool/discharge on different cycles to allow for more efficient use and to prevent thermal loss and damage.

Figure 24:
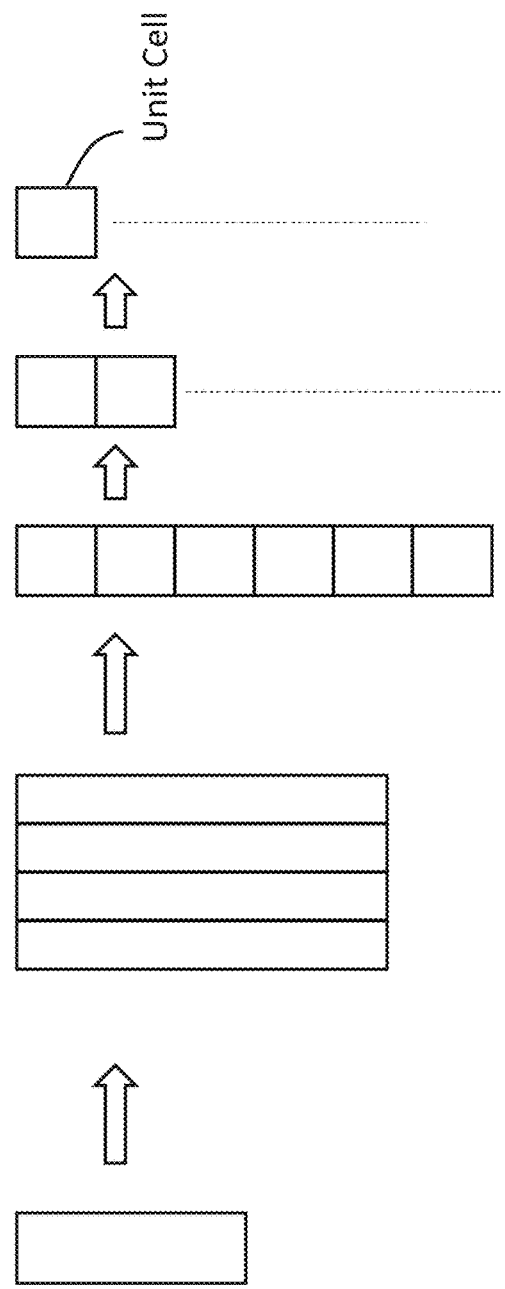
FIG. 24 shows a general illustration of the concept of cycling cells of a battery through separate charge/cooling/discharge/cooling cycles in accordance with certain embodiments

A general illustration of the concept of cycling cells of a battery through separate charge/cooling/discharge/cooling cycles is illustrated in FIG. 24. Expanding on this, each cell is made up of cells, which are made up of cells, all the way to the unit cell level. The cells can be arranged in large arrays of many dimensions.

Each cell level is charged separately, possibly down to the unit cell if needed. This is not required as the added circuitry may be cost prohibitive and charging controlled at a higher cell level will be adequate. The level of the depth of control can be determined during development.

Figure 25:
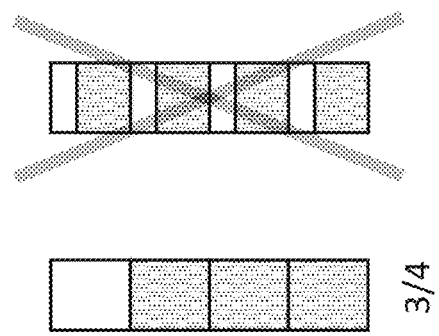
FIG. 25 depicts an explanation of charging level.

FIG. 25 depicts an explanation of charging level. The cells charge individually so that a % charge on a cell is when % of the internal cells that make up that overall cell are each individually fully charged, as seen in the left side of the drawing. This is not to be confused with charging each of the internal cells to %, as seen in the right side of the drawing.

Figure 27:
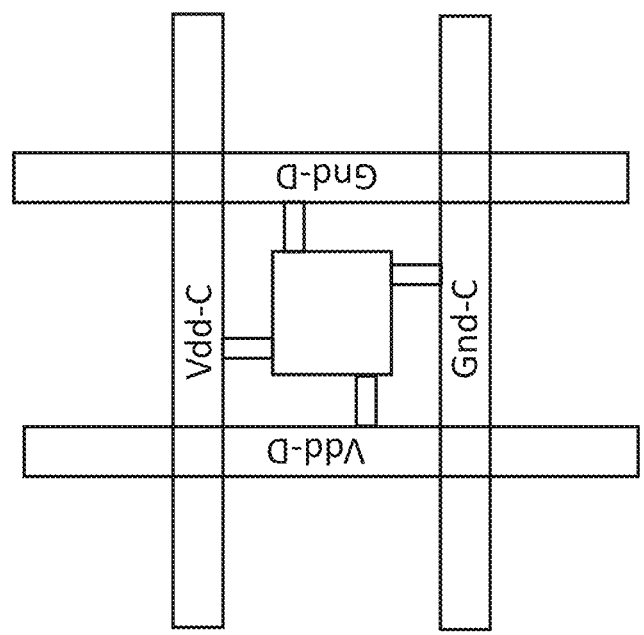
FIG. 27 shows a denser layout with separate Vdd and Ground for charge and discharge to allow for separate channels for current to run as well as the ability to run a pass through where the cell can both be charged and discharged at the same time in accordance with certain embodiments.
Figure 26:
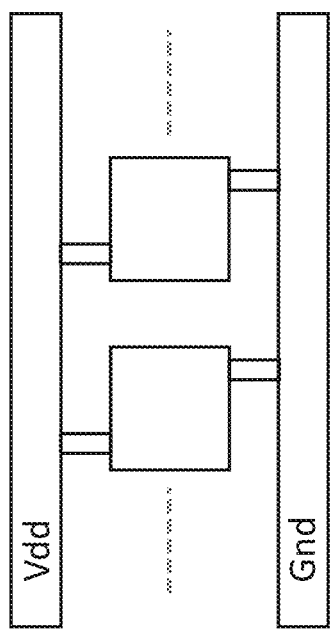
FIG. 26 shows Manhattan layout for connecting cells in accordance with certain embodiments.

FIGS. 26 and 27 show possible layouts for the unit cells. FIG. 26 shows a Manhattan layout with Vdd (Power) and Ground that is used in computer chip design. FIG. 27 shows a denser layout with separate Vdd and Ground for charge and discharge to allow for separate channels for current to run as well as the ability to run a pass through where the cell can both be charged and discharged at the same time.

Figure 28:
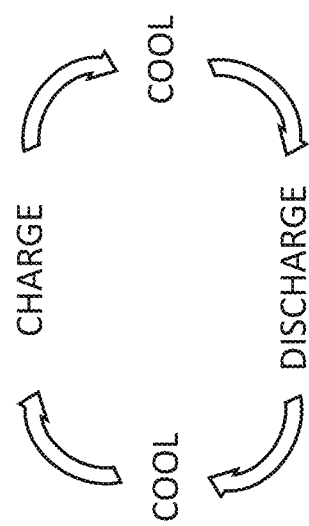
FIG. 28 shows a flow diagram of a method for charging and discharging cells that allows for a cooling cycle after discharge and prior to charging and after charging prior to discharging (use) in accordance with certain embodiments.

As detailed above, in certain embodiments, a method of charging and discharging cells that allows for a cooling cycle after discharge and prior to charging and after discharge prior to discharging (use) is provided, and illustrated in FIG. 28. Cooling->Charge->Cooling->Discharge->Cooling->Charge, etc. With increased user demand, this design ensures that not all cells within the battery are charging or discharging at the same time, so they will be in different states, lowering the overall temperature of the battery and reducing the likelihood of catastrophic breakdown resulting in fire or explosion.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted based on the foregoing description.

What is claimed is:

1. A battery conduit comprising:
a plurality of conduit links arranged in a linear direction, each conduit link defining a chamber for supporting one or more batteries of a battery belt, the plurality of conduit links being operable to constrain the battery belt for motion in the linear direction and to establish one or more operational zones that each accommodate a set of one or more batteries of the battery belt.

2. The battery conduit of claim 1, wherein the operational zones comprise one or more of a charging zone, a discharging zone, a testing zone, and a resting zone.

3. The battery conduit of claim 1, wherein the number of batteries of a first set of batteries is greater than then number of batteries of a second set of batteries.

4. The battery conduit of claim 1, wherein at least a first operational zone establishes one of a series or parallel electrical connection of batteries.

5. The battery conduit of claim 4, wherein at least a second operational zone establishes the other of the series or parallel electrical connection of batteries.

6. A battery management system comprising:
one or more conduits each having a plurality of conduit links arranged in a linear direction, each conduit link of a conduit defining a chamber for supporting one or more batteries of a battery belt associated with the conduit, the plurality of conduit links of each conduit being operable to constrain the battery belt associated with the conduit for motion in the linear direction and to establish one or more operational zones that each accommodate a set of batteries of the associated battery belt;

a controller; and a first actuator for moving a first set of one or more batteries of a battery belt associated with a first conduit of the one or more conduits in a linear direction in the first conduit based on instructions from the controller, said moving disposing the first set in a first operational zone comprising one of a testing zone, resting zone, discharging zone, or charging zone.

7. The battery management system of claim 6, further comprising:

a second actuator for moving a second set of one or more batteries of a battery belt associated with a second conduit of the one or more conduits in a linear direction in the second conduit based on instructions from the controller, said moving disposing the second set in a second operational zone comprising one of a testing zone, resting zone, discharging zone, or charging zone.

8. The battery management system of claim 7, wherein the first operational zone establishes one of a series or parallel electrical connection among the set of batteries disposed therein.

9. The battery management system of claim 8, wherein the second operational zone establishes the other of the series or parallel electrical connection among the set of batteries disposed therein, and wherein the first and second operational zones are electrically connected together.

10. The battery management system of claim 6, wherein the instructions are based on a C-rate value of one or more batteries of the first set.

11. A battery management system comprising:

one or more conduits each having a plurality of conduit links arranged in a linear direction, each conduit link of a conduit defining a chamber for supporting one or more batteries of a battery belt associated with the conduit, the plurality of conduit links of each conduit being operable to constrain the battery belt associated with the conduit for motion in the linear direction and to establish one or more operational zones that each accommodate a set of batteries of the associated battery belt;

a controller; and a first actuator for moving a first set of one or more batteries of a battery belt associated with a first conduit of the one or more conduits in a linear direction in the first conduit based on instructions from the controller, said moving disposing the first set in a first operational zone comprising one of a testing zone, resting zone, discharging zone, or charging zone, wherein the instructions are based on an action of a vehicle in which the battery management system is installed.

12. The battery management system of claim 11, wherein the action is acceleration or deceleration.

13. The battery management system of claim 11, wherein the action is performance operation or cruising.

14. A battery management system comprising:

one or more conduits each having a plurality of conduit links arranged in a linear direction, each conduit link of a conduit defining a chamber for supporting one or more batteries of a battery belt associated with the conduit, the plurality of conduit links of each conduit being operable to constrain the battery belt associated with the conduit for motion in the linear direction and to establish one or more operational zones that each accommodate a set of batteries of the associated battery belt;

a controller; and a first actuator for moving a first set of one or more batteries of a battery belt associated with a first conduit of the one or more conduits in a linear direction in the first conduit based on instructions from the controller, said moving disposing the first set in a first operational zone comprising one of a testing zone, resting zone, discharging zone, or charging zone, wherein the instructions are based on climate conditions.

15. A battery management system comprising:

one or more conduits each having a plurality of conduit links arranged in a linear direction, each conduit link of a conduit defining a chamber for supporting one or more batteries of a battery belt associated with the conduit, the plurality of conduit links of each conduit being operable to constrain the battery belt associated with the conduit for motion in the linear direction and to establish one or more operational zones that each accommodate a set of batteries of the associated battery belt;

a controller; and a first actuator for moving a first set of one or more batteries of a battery belt associated with a first conduit of the one or more conduits in a linear direction in the first conduit based on instructions from the controller, said moving disposing the first set in a first operational zone comprising one of a testing zone, resting zone, discharging zone, or charging zone, wherein the instructions are based on economic considerations.

16. The battery management system of claim 6, wherein the instructions are based on a conservation goal.

17. The battery management system of claim 16, wherein the conservation goal includes factors selected from outside temperature, charge and discharge rates, battery type, and battery age.

18. The battery management system of claim 6, wherein the instructions are based on a temperature of at least one battery.

19. A method for managing batteries of a vehicle comprising:

moving a first battery belt of mechanically-linked batteries in a first conduit to dispose a set one or more batteries of the first battery belt in a first operational zone of the first conduit; and moving a second battery belt of mechanically-linked batteries in a second conduit to dispose a set one or more batteries of the second battery belt in a first operational zone of the second conduit, wherein each of the operational zones comprises one of a testing zone, resting zone, discharging zone, or charging zone.

20. The method of claim 19, further comprising:

moving the first battery belt in the first conduit to dispose the set one or more batteries of the first battery belt in a second operational zone of the first conduit, wherein the second operational zone of the first conduit comprises one of a testing zone, resting zone, discharging zone, or charging zone.

21. The method of claim 19, wherein said moving is based on a C-rate value of one or more batteries of the first battery belt.

22. A method for managing batteries of a vehicle comprising:
- moving a first battery belt of mechanically-linked batteries in a first conduit to dispose a set one or more batteries of the first battery belt in a first operational zone of the first conduit; and
- moving a second battery belt of mechanically-linked batteries in a second conduit to dispose a set one or more batteries of the second battery belt in a first operational zone of the second conduit,
- wherein each of the operational zones comprises one of a testing zone, resting zone, discharging zone, or charging zone, and
- wherein said moving is based on an action of a vehicle in which the battery management system is installed.

23. The method of claim 22, wherein the action is acceleration or deceleration.

24. The method of claim 22, wherein the action is performance operation or cruising.

25. A method for managing batteries of a vehicle comprising:
- moving a first battery belt of mechanically-linked batteries in a first conduit to dispose a set one or more batteries of the first battery belt in a first operational zone of the first conduit; and
- moving a second battery belt of mechanically-linked batteries in a second conduit to dispose a set one or more batteries of the second battery belt in a first operational zone of the second conduit,
- wherein each of the operational zones comprises one of a testing zone, resting zone, discharging zone, or charging zone, and
- wherein said moving is based on climate conditions.

26. A method for managing batteries of a vehicle comprising:
- moving a first battery belt of mechanically-linked batteries in a first conduit to dispose a set one or more batteries of the first battery belt in a first operational zone of the first conduit; and
- moving a second battery belt of mechanically-linked batteries in a second conduit to dispose a set one or more batteries of the second battery belt in a first operational zone of the second conduit,
- wherein each of the operational zones comprises one of a testing zone, resting zone, discharging zone, or charging zone, and
- wherein said moving is based on economic considerations.

27. The method of claim 19, wherein said moving is based on a conservation goal.

28. The method of claim 27, wherein the conservation goal includes factors selected from outside temperature, charge and discharge, rates, battery type, and battery age.

29. The method of claim 19, wherein said moving is based on a temperature of at least one battery.

* * * * *